(12) United States Patent
Kotzur et al.

(10) Patent No.: US 11,422,740 B2
(45) Date of Patent: Aug. 23, 2022

(54) RAID STORAGE-DEVICE-ASSISTED DATA UPDATE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 16/586,445

(22) Filed: Sep. 27, 2019

(65) Prior Publication Data

US 2021/0096767 A1 Apr. 1, 2021

(51) Int. Cl.
*G06F 3/06* (2006.01)
*G06F 11/10* (2006.01)
*G06F 13/28* (2006.01)

(52) U.S. Cl.
CPC .......... *G06F 3/0659* (2013.01); *G06F 3/0604* (2013.01); *G06F 3/0689* (2013.01); *G06F 11/1076* (2013.01); *G06F 13/28* (2013.01)

(58) Field of Classification Search
CPC .... G06F 3/0659; G06F 3/0604; G06F 3/0689; G06F 11/1076; G06F 13/28
See application file for complete search history.

(56) References Cited

U.S. PATENT DOCUMENTS

| 6,151,641 A | 11/2000 | Herbert |
| 9,384,093 B1 * | 7/2016 | Aiello ................ G06F 3/0688 |
| 2013/0166857 A1 * | 6/2013 | Kawano ............. G06F 11/108 |
| | | 711/155 |
| 2018/0341548 A1 * | 11/2018 | Bolkhovitin ...... H03M 13/2942 |
| 2018/0341549 A1 | 11/2018 | Bolkhovitin et al. |

OTHER PUBLICATIONS

Thapiliyal, Rohit. "Compute the parity of a number using XOR and table look-up", *Geeks for Geeks.org*, , https://www.geeksforgeeks.org/compute-parity-number-using-xor-table-look/.

* cited by examiner

*Primary Examiner* — Michelle T Bechtold
(74) *Attorney, Agent, or Firm* — Joseph Mencher

(57) ABSTRACT

A RAID storage-device-assisted data update system includes a RAID storage controller coupled to first RAID storage devices each including respective first RAID storage subsystems. Each first RAID storage devices receives a command from the RAID storage controller that identifies a second RAID buffer subsystem as a target memory location and, in response, retrieves respective first RAID storage device data from its respective first RAID storage subsystem and performs DMA operations to provide that first RAID storage device data on the second RAID buffer subsystem. A second RAID storage device that includes the second RAID buffer subsystem and a second RAID storage subsystem receives a command from the RAID storage controller and, in response, performs an XOR operation using the first RAID storage device data in the second RAID buffer subsystem to produce update data that it stores in its second RAID storage subsystem.

20 Claims, 24 Drawing Sheets

RAID STORAGE-DEVICE-ASSISTED DATA UPDATE SYSTEM

BACKGROUND

The present disclosure relates generally to information handling systems, and more particularly to data update operations assisted by Redundant Array of Independent Disk (RAID) storage devices in an Information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and that performance is even projected to be much greater than the performance capabilities of next-generation RAID storage controllers), which results in those RAID storage controllers being unable to manage more than a few NVMe storage devices (e.g., conventional RAID storage controllers are currently capable of managing approximately four NVMe storage devices). As such, the use of NVMe storage devices in RAID storage subsystems present RAID storage system scaling issues, as the RAID storage controllers cannot scale with more than a few NVMe storage devices.

Accordingly, it would be desirable to provide a RAID storage system that addresses the issues discussed above.

SUMMARY

According to one embodiment, an Information Handling System (IHS) includes a Redundant Array of Independent Disk (RAID) buffer subsystem; a RAID storage subsystem; a processing system that is coupled to the RAID buffer subsystem and the RAID storage subsystem; and a memory system that is coupled to the processing system and that includes instructions that, when executed by the processing system, cause the processing system to provide a RAID storage engine that is configured to: receive a command from a RAID storage controller device; perform, in response to the command, an XOR operation using respective RAID storage device data that was received in the RAID buffer subsystem via respective Direct Memory Access (DMA) operations performed by each of a plurality of RAID storage devices, wherein the XOR operation using the respective RAID storage device data produces update data; and provide the update data in the RAID storage subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
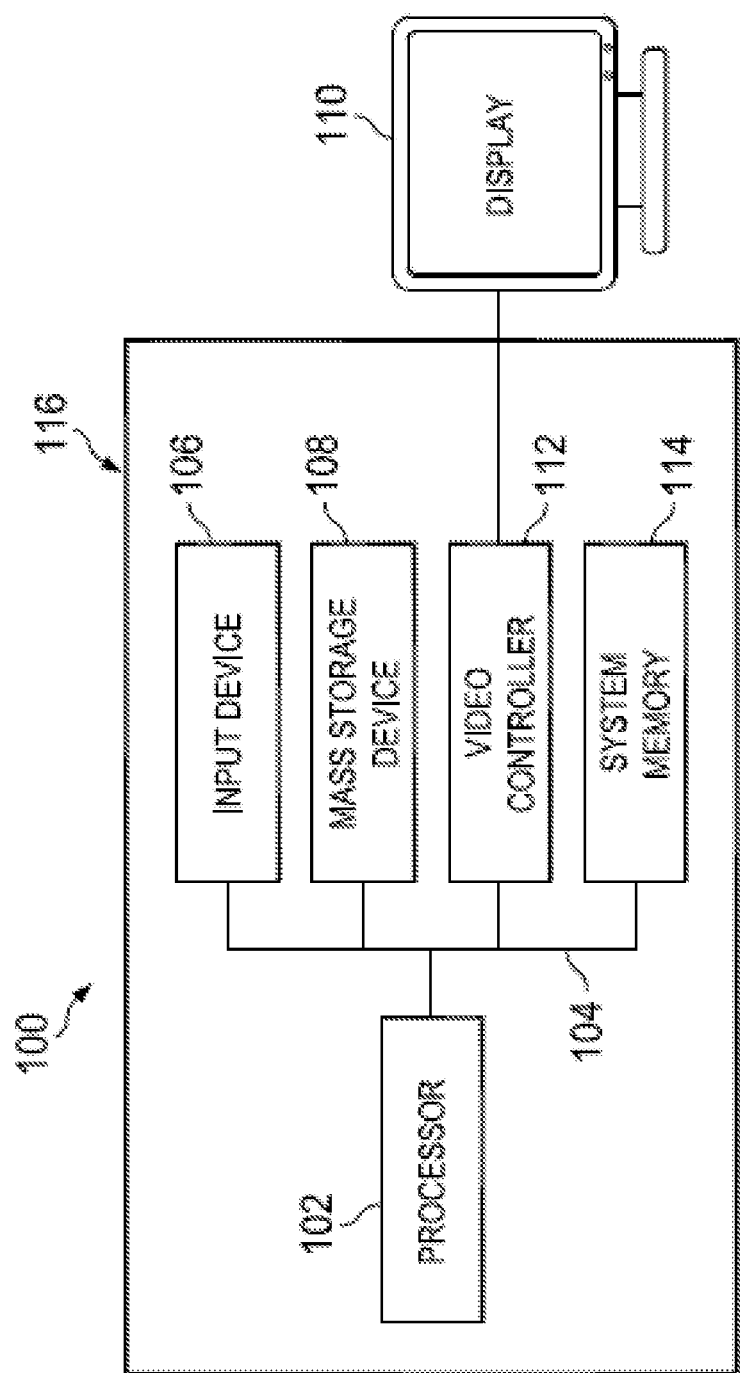
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
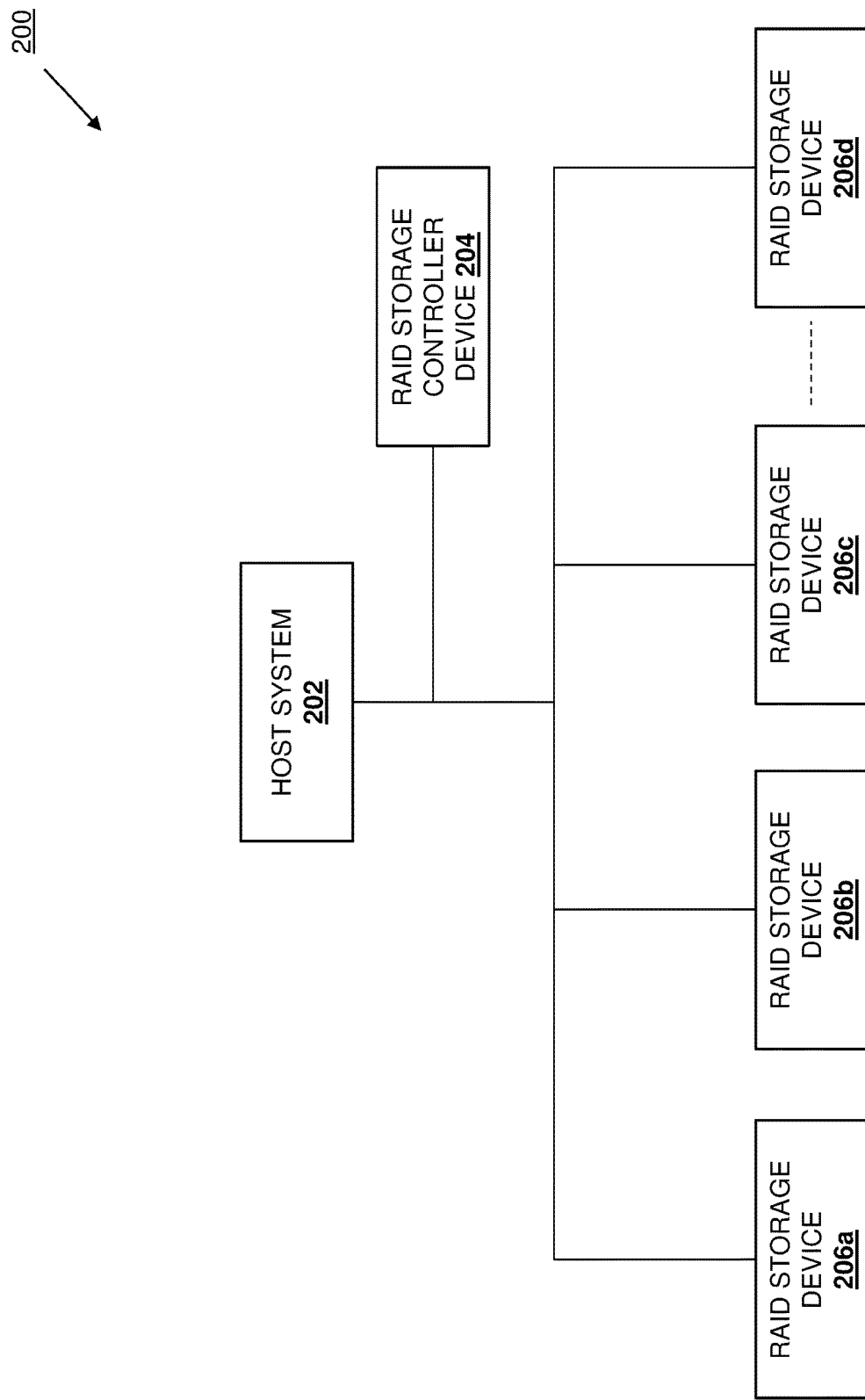
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID storage system 200 also includes a RAID storage controller system 204 that is coupled to the host system 202 and that may be provided by the IHS 100 discussed above with reference to FIG. 1, and/or may include some or all of the components of the IHS 100. For example, the RAID controller system 204 may include any storage device/disk array controller device that is configured to manage physical storage devices and present them to host systems as logical units.

Furthermore, in the illustrated embodiment, the RAID storage system 200 also includes a plurality of RAID storage devices 206a, 206b, 206c, and up to 206d, each of which is coupled to the host system 202 and the RAID storage controller system 204. While a few RAID storage devices 206a-206d are illustrated, one of skill in the art in possession of the present disclosure will recognize that many more storage devices may (and typically will) be coupled to the RAID storage controller system 204 (e.g., in a datacenter) while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
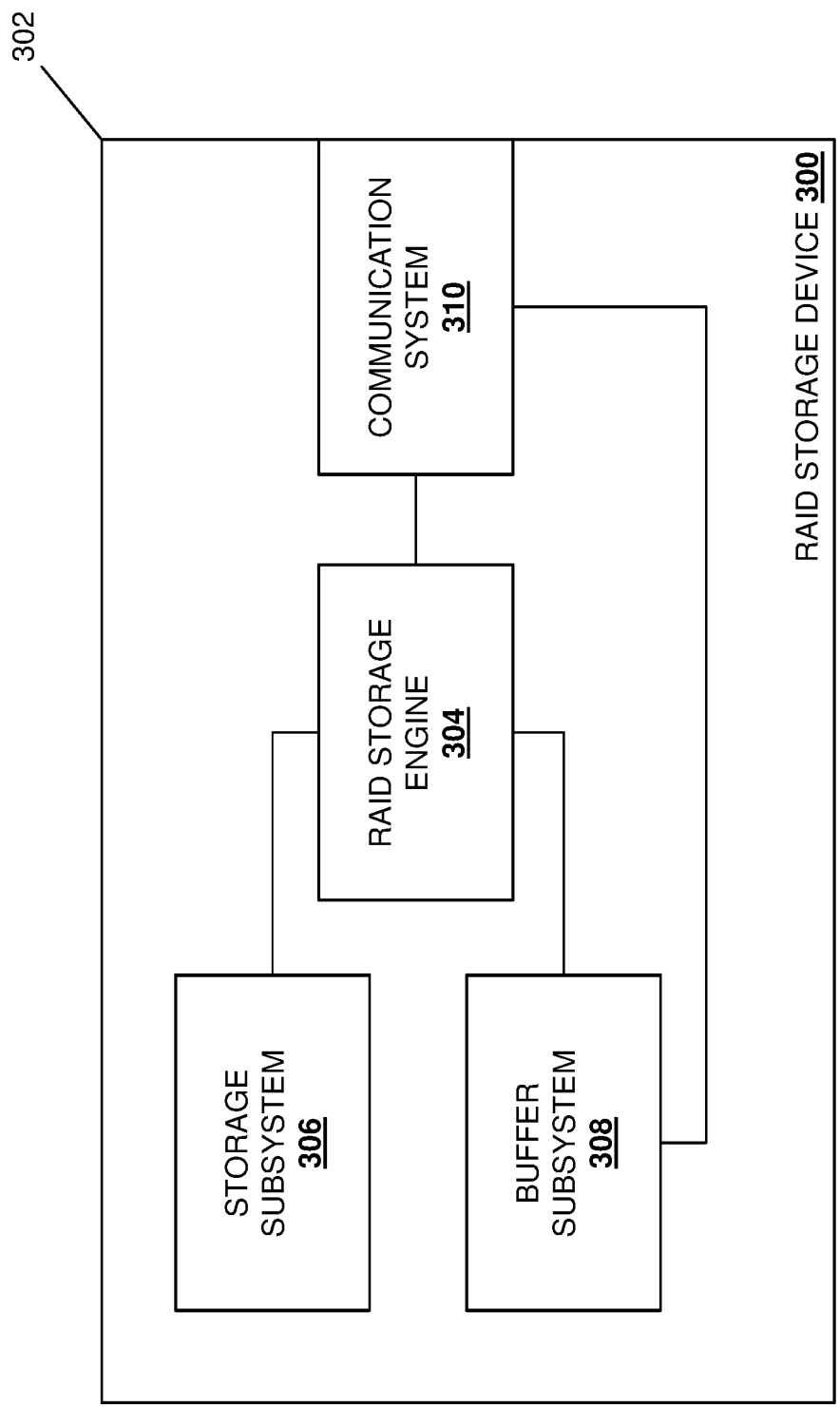
FIG. 3 is a schematic view illustrating an embodiment of a RAID storage device provided in the RAID storage system of FIG. 2.

Referring now to FIG. 3, an embodiment of a RAID storage device 300 is illustrated that may provide any or all of the RAID storage devices 206a-206d discussed above with reference to FIG. 2. As such, the RAID storage device 300 may be provided by an NVMe SSD drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD drive, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer system that includes a buffer subsystem 308 that is coupled to the RAID storage engine 304 (e.g., via a coupling between the buffer subsystem 308 and the processing system). Continuing with the example provided above in which the RAID storage device 300 is an NVMe SSD drive, the buffer system may be provided by one or more buffer memory devices that include a subset of memory address ranges that provide the buffer subsystem 308.

In the examples below, the buffer subsystem 308 is provided by a "Controller Memory Buffer" (CMB), "scratchpad buffer", or "cache buffer" that may be distinguished from the rest of the buffer system. For example, the subset of memory address ranges in the buffer memory device(s) that provide the buffer subsystem 308/CMB may be mapped to the PCIe memory space of the host system 202, which one of skill in the art in possession of the present disclosure will recognize makes the buffer subsystem 308/CMB visible to the host system 202 while the rest of the buffer system (sometimes referred to as a "device buffer") is not (i.e., due to the memory address ranges in the buffer memory device(s) that provide the device buffer not being mapping to the PCIe memory space of the host system 202.) As will be appreciated by one of skill in the art in possession of the present disclosure, mapping the buffer subsystem 308/CMB to the PCIe memory space of the host system 202 allows for the buffer subsystem 308/CMB to be the target of the Direct Memory Access (DMA) data operation discussed below. As will be appreciated by one of skill in the art in possession of the present disclosure, the CMB (buffer subsystem 308) may be separate from a write buffer that is provided in the NVMe SSD drive (RAID storage device 300) as an elasticity buffer that is configured to match the PCI interface speeds with the flash memory speeds. However, one of skill in the art in possession of the present disclosure will recognize that the buffer subsystem 308 may be provided using other buffer technologies while remaining within the scope of the present disclosure as well.

The chassis 302 may also house a communication system 310 that is coupled to the RAID storage engine 304 (e.g., via a coupling between the communication system 308 and the processing system) and the buffer subsystem 308, and that may be provided by any of a variety of storage device communication technologies and/or any other communication components that would be apparent to one of skill in the art in possession of the present disclosure. Continuing with the example provided above in which the RAID storage device 300 is an NVMe SSD drive, the communication system 310 may include any NVMe SSD storage device communication components (e.g., a PCIe interface) that enable the Direct Memory Access (DMA) operations described below, the submission queues and completion queues discussed below, as well as any other NVMe SDD drive communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

Figure 4:
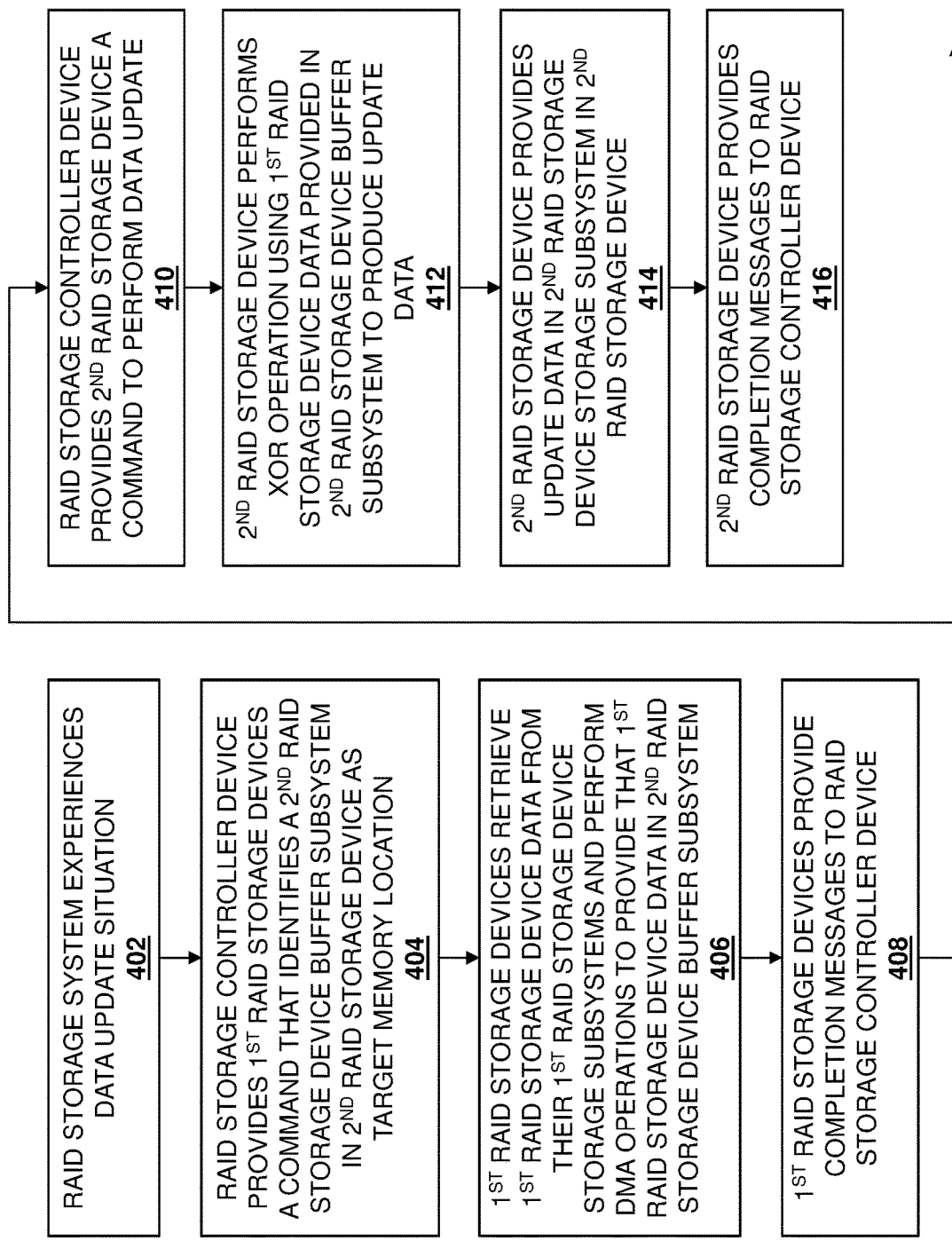
FIG. 4 is a flow chart illustrating an embodiment of a method for providing RAID storage-device-assisted data update operations.

Referring now to FIG. 4, an embodiment of a method 400 for providing RAID storage-device-assisted data update operations is illustrated. As discussed below, the systems and methods of the present disclosure provide for the updating of data on a first RAID storage device in a RAID storage system in a manner that is assisted by a plurality of second RAID storage devices in that RAID storage system. As discussed below, the updating of data performed by the systems and methods of the present disclosure may include parity data updates that are performed when new primary data is provided on one or more of the second RAID storage devices, primary data rebuilds when primary data is lost on the first RAID storage device, and/or any other updating of data on any RAID storage devices that would be apparent to one of skill in the art in possession of the present disclosure. For example, each of the second RAID storage devices may receive a first command from a RAID storage controller device that identifies a buffer subsystem in the first RAID storage device as a target memory location and, in response, may retrieve respective second RAID storage device data from the respective storage subsystem in that second RAID storage device and perform Direct Memory Access (DMA) operations to provide the respective second RAID storage device data on the buffer subsystem in the first RAID storage device. The first RAID storage device may then receive a second command from the RAID storage controller device and, in response, may perform an XOR operation using the second RAID storage device data provided in the first RAID storage device buffer subsystem by each of the plurality of second RAID storage devices in order to produce update data, and provide the update data in its storage subsystem. As such, data update operations are offloaded from the RAID storage controller device, thus increasing the ability of the RAID storage controller device to scale with high performance RAID storage devices.

Figure 5A:
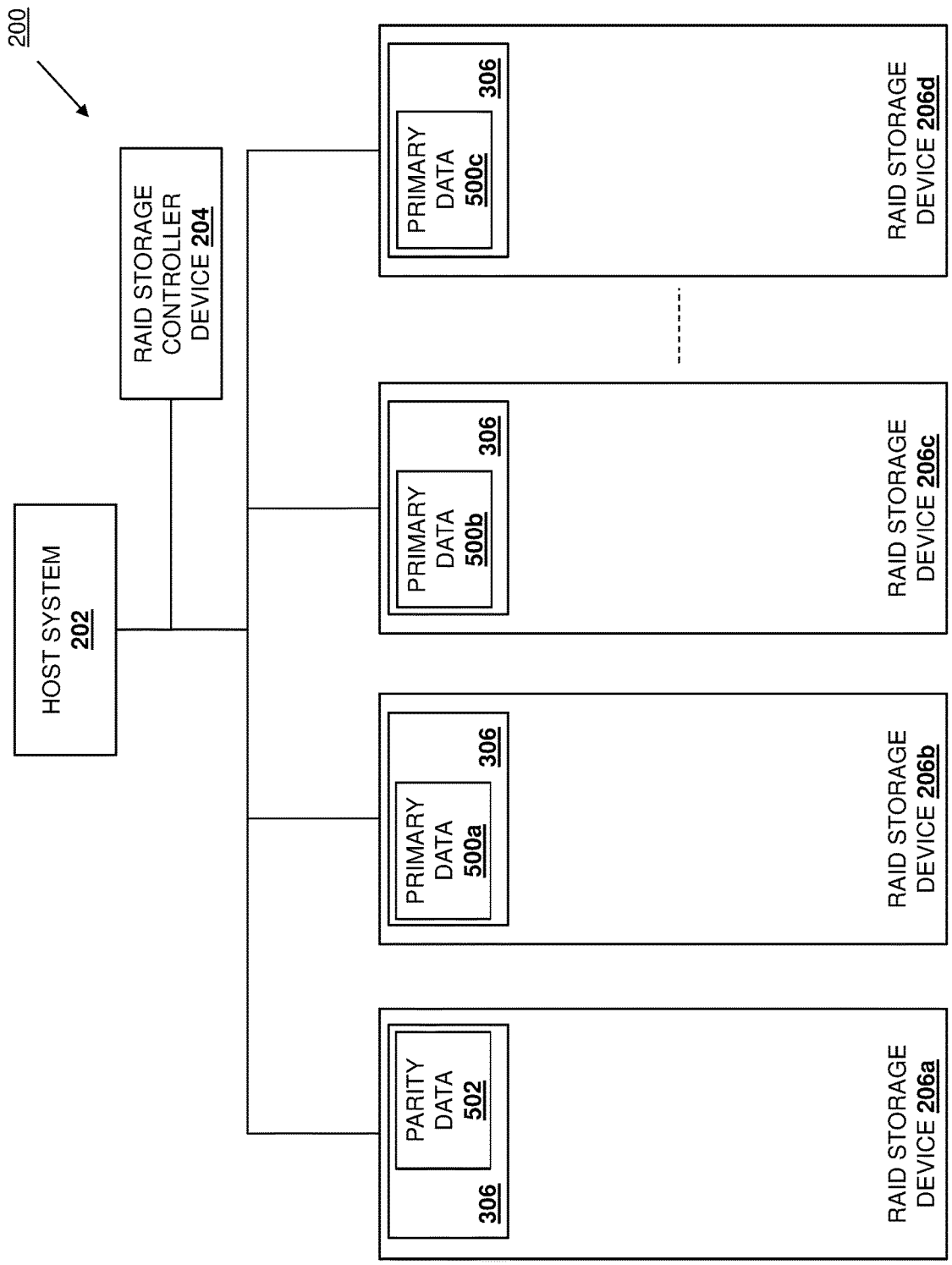
FIG. 5A is a schematic view illustrating an embodiment of the RAID storage system of FIG. 2 operating during the method of FIG. 4.

The method 400 begins at block 402 where a RAID storage system experiences a data update situation. In an embodiment, at block 402, the RAID storage system 200 may experience a data update situation which, as discussed above, may be any of a variety of situations that one of skill in the art in possession of the present disclosure would recognize as requiring data to be generated and provided on a RAID storage device in the RAID storage system 200. In the embodiment illustrated in FIGS. 5A and 5B, a parity data update situation is illustrated that may occur when the host system 200 provides data for the RAID storage system 200 to the RAID controller device 204, and the RAID storage controller device 204 provides that data on one or more of the RAID storage devices. For example, FIG. 5A illustrates how the RAID storage devices 206b, 206c, and up to 206d each store primary data 500a, 500b, and up to 500c, respectively, in their respective storage subsystems 306, while the RAID storage device 206a stores parity data 502 in its storage subsystem 306.

As will be appreciated by one of skill in the art in possession of the present disclosure, the parity data 502 is generated via the performance of an XOR operation on the primary data 500a-500c, and allows for the recovery of primary data on any one of the RAID storage devices 206c-206d in the event that primary data becomes unavailable. As will also be appreciated by one of skill in the art in possession of the present disclosure, the primary/parity data storage configuration illustrated in FIG. 5A provides primary/parity data for a single data strip, and different data strips may have different primary/parity data storage configurations (e.g., a data stripe with primary data stored on the storage subsystems 306 in the RAID storage devices 206a, 206c, and 206d, and the parity data stored on the storage subsystem 306 in the RAID storage device 206b; a data stripe with primary data stored on the storage subsystems 306 in the RAID storage devices 206a, 206b, and 206d, and the parity data stored on the storage subsystem 306 in the RAID storage device 206c, etc.)

Figure 5B:
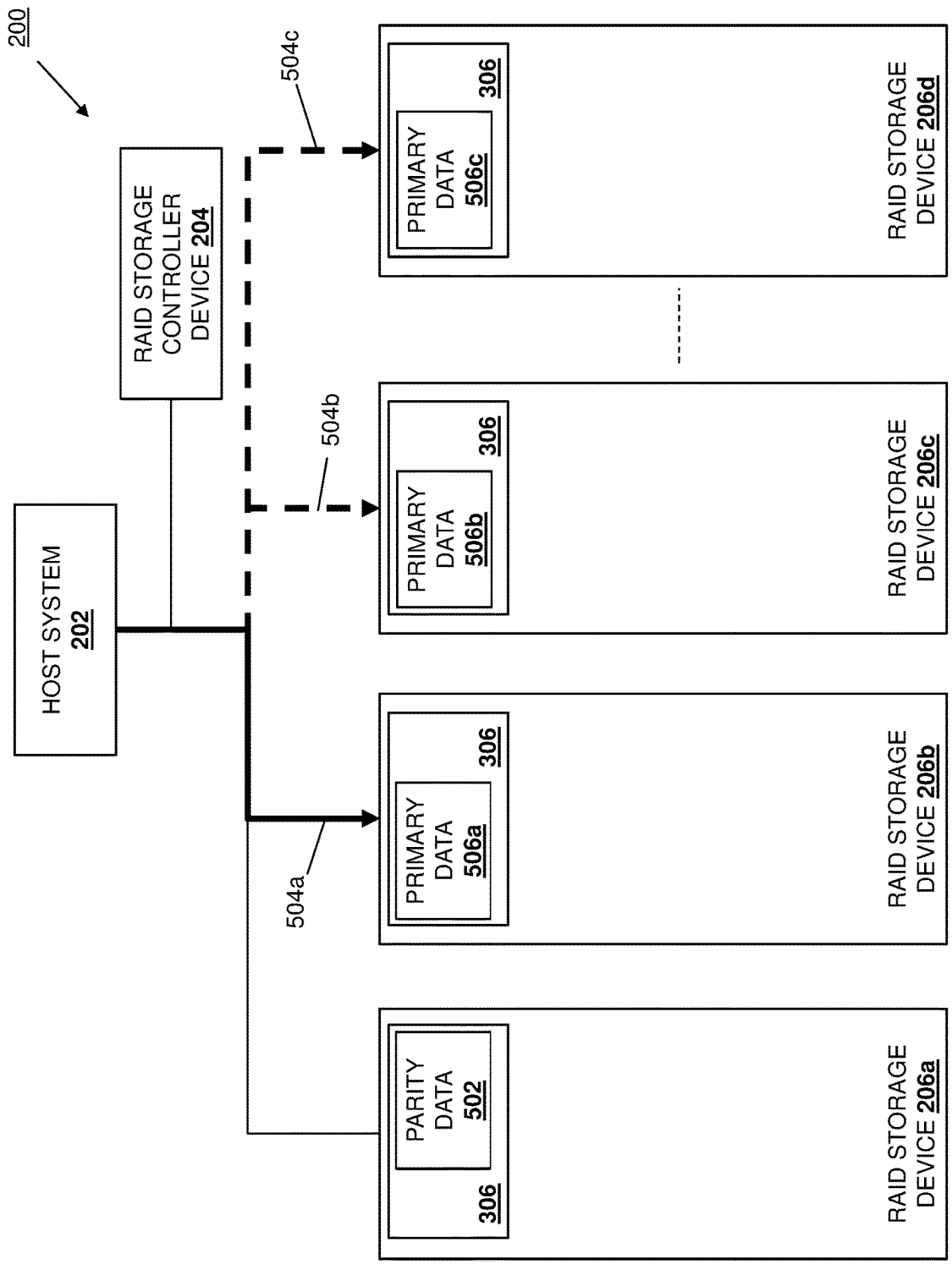
FIG. 5B is a schematic view illustrating an embodiment of the RAID storage system of FIG. 2 operating during the method of FIG. 4.

FIG. 5B illustrates how, in the parity data update situation discussed above, the host system 202 may provide data on one or more of the RAID storage devices 206b-206d by performing a data write operation 504a to write primary data 506a to the storage subsystem 306 in the RAID storage device 206b, an optional data write operation 504b to write primary data 506b to the storage subsystem 306 in the RAID storage device 206c, and an optional data write operation 504c to write primary data 506c to the storage subsystem 306 in the RAID storage device 206d. In the specific examples provided below, the optional data write operations 504b and 504c are described as having been performed, which one of skill in the art in possession of the present disclosure will recognize provides a "full stripe write" in which each of the primary data 502a-502c is replaced by respective primary data 506a-506c in the RAID storage devices 206b-206d. However, as also discussed below, in some embodiments the optional data write operations 504b and/or 504c may not be performed (e.g., only the primary data 502a is replaced with the primary data 506a on the RAID storage device 206b), which one of skill in the art in possession of the present disclosure will recognize provides a "partial stripe write", and which requires some modified operations discussed in further detail below. As will be appreciated by one of skill in the art in possession of the present disclosure, the parity data update situation illustrated in FIGS. 5A and 5B requires a parity data update, as the replacement of any of the primary data 502a, 502b, and/or 502c on the RAID storage devices 206b-206d requires the parity data 502 to be updated on the RAID storage device 206a so that it may be utilized for the primary data recovery functionality discussed above.

Figure 6A:
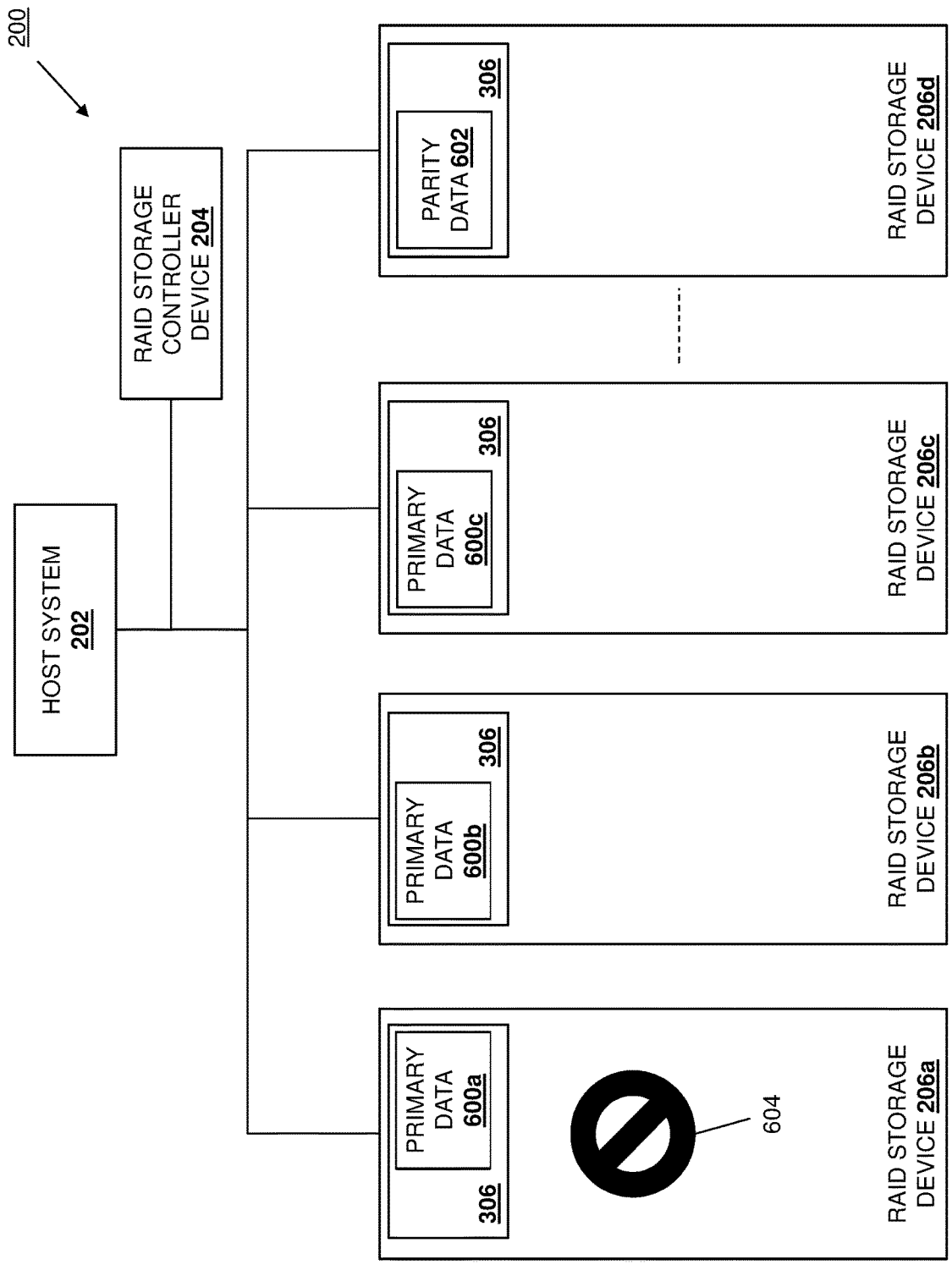
FIG. 6A is a schematic view illustrating an embodiment of the RAID storage system of FIG. 2 operating during the method of FIG. 4.
Figure 6B:
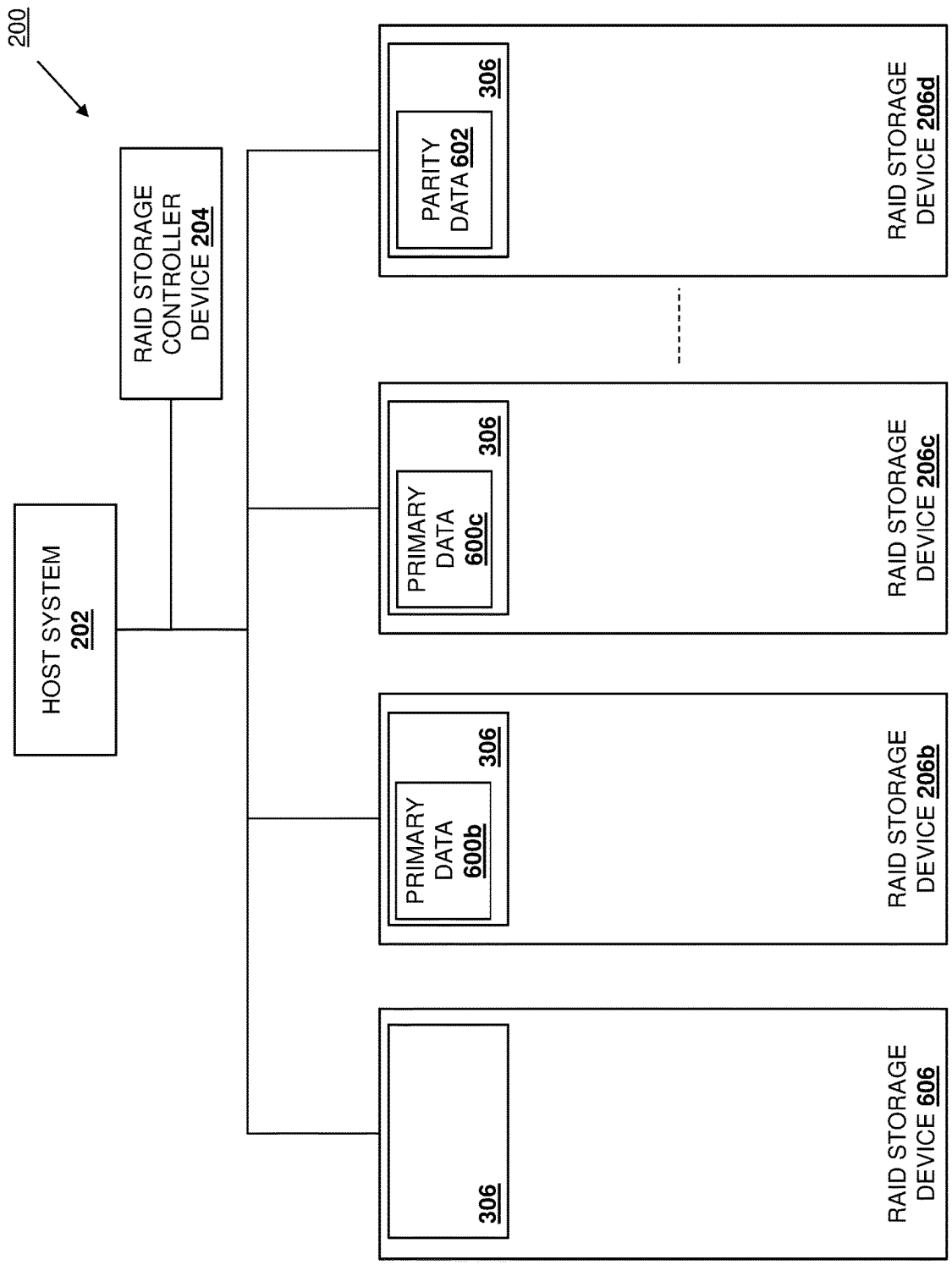
FIG. 6B is a schematic view illustrating an embodiment of the RAID storage system of FIG. 2 operating during the method of FIG. 4.

In the embodiment illustrated in FIGS. 6A and 6B, a primary data update situation is illustrated that may occur when primary data stored on a RAID storage device in the RAID storage system 200 becomes unavailable (e.g., due to a failure of that RAID storage device, deletion of the data on that RAID storage device, and/or due to a variety of other scenarios that would be apparent to one of skill in the art in possession of the present disclosure.) For example, FIG. 6A illustrates how the RAID storage devices 206a, 206b, and 206c each store primary data 600a, 600b, and up to 600c, respectively, in their respective storage subsystems 306, while the RAID storage device 206d stores parity data 602 on its storage subsystem 306. As will be appreciated by one of skill in the art in possession of the present disclosure, the parity data 602 is generated via the performance of an XOR operation on the primary data 600a-600c, and allows for the recovery of primary data on any one of the RAID storage devices 206a-206c in the event that primary data becomes unavailable. As will also be appreciated by one of skill in the art in possession of the present disclosure, the primary/parity data storage configuration illustrated in FIG. 6A provides primary/parity data for a single data strip, and different data strips may have different primary/parity data storage configurations (e.g., a data stripe with primary data stored on the storage subsystems 306 in the RAID storage devices 206b, 206c, and 206d, and the parity data stored on the storage subsystem 306 in the RAID storage device 206a; a data stripe with primary data stored on the storage subsystems 306 in the RAID storage devices 206a, 206b, and 206d, and the parity data stored on the storage subsystem 306 in the RAID storage device 206c, etc.)

FIG. 6A illustrates how, in the primary data update situation discussed above, the RAID storage device 206a may fail (as illustrated by element 604 in FIG. 6A), which one of skill in the art in possession of the present disclosure will recognize may render the primary data 600a that was stored on the storage subsystem 306 in the RAID storage device 206a lost or otherwise unavailable. Furthermore, FIG. 6B illustrates how the RAID storage device 206a may then be replaced by a RAID storage device 606, which may be substantially similar to the RAID storage devices 206b-206d, and thus may be provided by the RAID storage device 300 discussed above with reference to FIG. 3. As will be appreciated by one of skill in the art in possession of the present disclosure, the primary data update situation illustrated in FIGS. 6A and 6B requires a primary data update, as the loss of the primary data 600a and the replacement of the RAID storage device 206a with the RAID storage device 606 requires the primary data 600a to be regenerated and provided on that RAID storage device 606. However, while two specific examples of data update situations have been described (and are described below with regard to the RAID storage-drive-assisted data update functionality of the present disclosure), one of skill in the art in possession of the present disclosure will recognize that a variety of other data update situations for RAID storage systems will fall within the scope of the present disclosure as well.

The method 400 then proceeds to block 404 where a RAID storage controller provides first RAID storage devices a command that identifies a second RAID storage device buffer subsystem in a second RAID storage device as a target memory location. In an embodiment, at block 404, the RAID storage controller device 204 may identify the data update situation experienced by the RAID storage subsystem 200. For example, with regard to the parity data update situation discussed above with reference to FIGS. 5A and 5B, the RAID storage controller device 204 may identify the data write operation(s) 504a, 504b, and/or 504c and, in response, may determine that the parity data update situation has occurred. In another example, with regard to the primary data update situation discussed above with reference to FIGS. 6A and 6B, the RAID storage controller device 204 may identify the unavailability of the primary data 600a (e.g., by detecting the failure of the RAID storage device 206a, detecting the replacement of the RAID storage device 206a with the RAID storage device 606, receiving an instruction from a user, etc.) and, in response, may determine that the primary data update situation has occurred. In response to detecting the data update situation, the RAID storage controller device 204 may generate and transmit a command to a subset of the RAID storage devices in the RAID storage system 200 that identifies the buffer subsystem in a RAID storage device that is not included in that subset and that requires a data update.

Figure 7A:
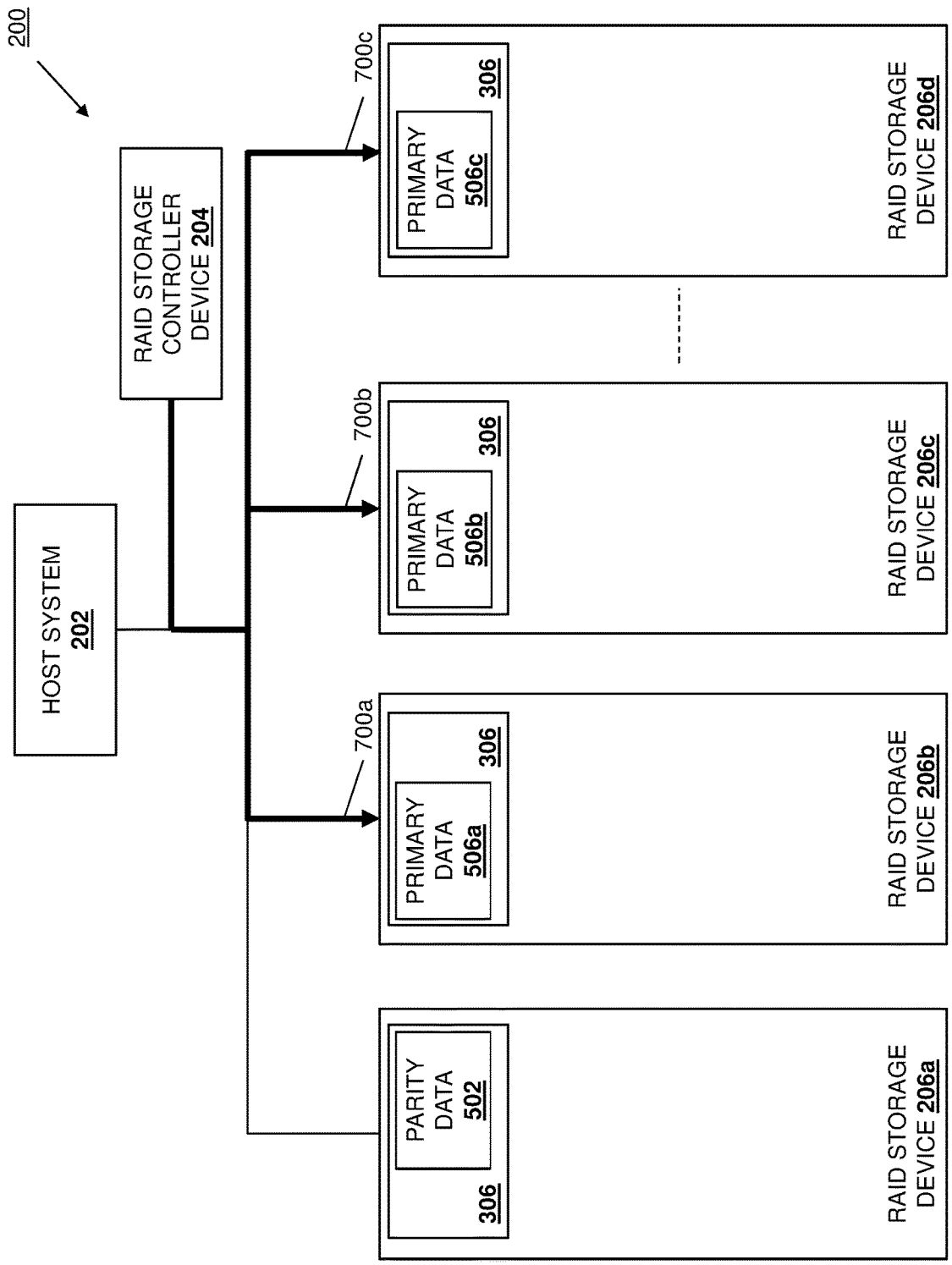
FIG. 7A is a schematic view illustrating an embodiment of the RAID storage system of FIG. 2 operating during the method of FIG. 4.

With reference to FIG. 7A, and continuing with the example of the parity data update situation discussed above with reference to FIGS. 5A and 5B that involves a full stripe write, at block 404 the RAID storage controller device 204 may generate and transmit a parity data update command 700a to the RAID storage device 206b, a parity data update command 700b to the RAID storage device 206c, and a parity data update command 700c to the RAID storage device 206d. For example, each of the parity data update commands 700a-700c may include a read command that identifies the buffer subsystem 308 in the RAID storage device 206a as a target memory location (e.g., a section of the CMB in that RAID storage device 206a), and that RAID storage controller device 204 may submit those read/parity data update commands 700a-700c in the submission queues of each of the RAID storage devices 206b-206d, respectively, and then ring the doorbells of each of those RAID storage devices 206b-206d. However, one of skill in the art in possession of the present disclosure will recognize that parity data update situations that involve partial stripe writes may involve the RAID storage controller device 204 transmitting parity data update command(s) to only the RAID storage devices to which new primary data was written.

Figure 8A:
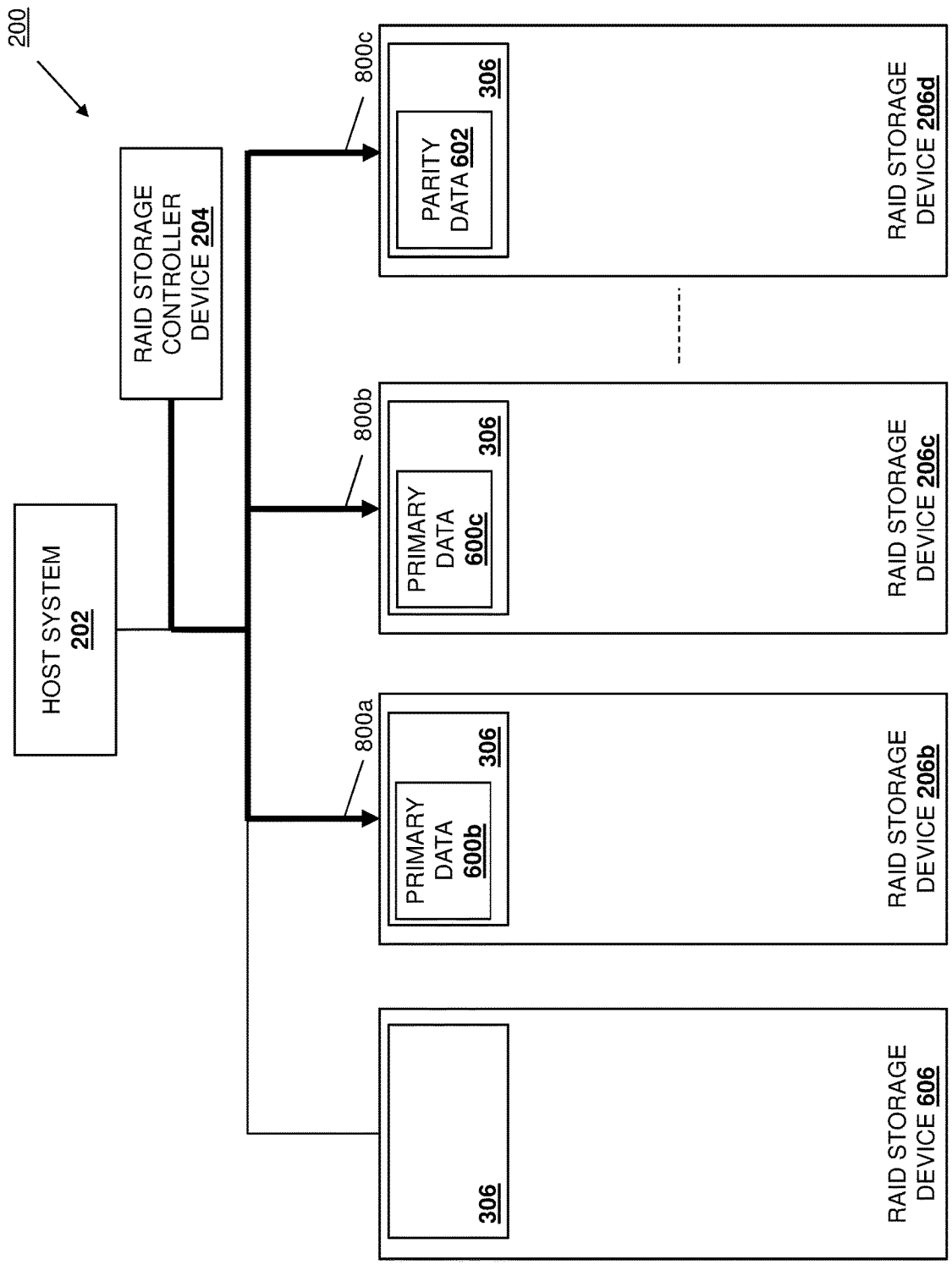
FIG. 8A is a schematic view illustrating an embodiment of the RAID storage system of FIG. 2 operating during the method of FIG. 4.

With reference to FIG. 8A, and continuing with the example of the parity data update situation discussed above with reference to FIGS. 6A and 6B that involves a full stripe write, at block 404 the RAID storage controller device 204 may generate and transmit a primary data update command 800a to the RAID storage device 206b, a primary data update command 800b to the RAID storage device 206c, and a primary data update command 800c to the RAID storage device 206d. For example, each of the primary data update commands 800a-800c may include a read command that identifies the buffer subsystem 308 in the RAID storage device 606 as a target memory location (e.g., a section of the CMB in that RAID storage device 606), and that RAID storage controller device 204 may submit those read/primary data update commands 800a-800c to the submission queues in the communication system 310 of each of the RAID storage devices 206b-206d, respectively, and then ring the doorbells of each of those RAID storage devices 206b-206d.

The method 400 then proceeds to block 406 where the first RAID storage devices retrieve first RAID storage device data from their first RAID storage device storage subsystems and perform Direct Memory Access (DMA) operations to provide that first RAID storage device data in the second RAID storage device buffer subsystem. Continuing with the example of the parity data update situation discussed above with reference to FIGS. 5A, 5B, and 7A that involves a full stripe write, at block 406 and in response to the RAID storage controller device 204 ringing their doorbells, each of the RAID storage devices 206b-206d may retrieve the read/parity data update commands 700a, 700b, and 700c, respectively, from their submission queues in their communication system 310, and execute their respective parity data update command 700a, 700b, and 700c. For example, as illustrated in FIG. 7B, the RAID storage engine 304 in the RAID storage device 206b/300 may retrieve the parity data update command 700a from the submission queue in its communication system 310 and, in response, may execute that parity data update command 700a to retrieve the primary data 506a from its storage subsystem 306 and perform a Direct Memory Access (DMA) operation 701a to provide that primary data 506a in the buffer subsystem 308 (e.g., the CMB) in the RAID storage device 206a that is identified in the parity data update command 700a.

Figure 7B:
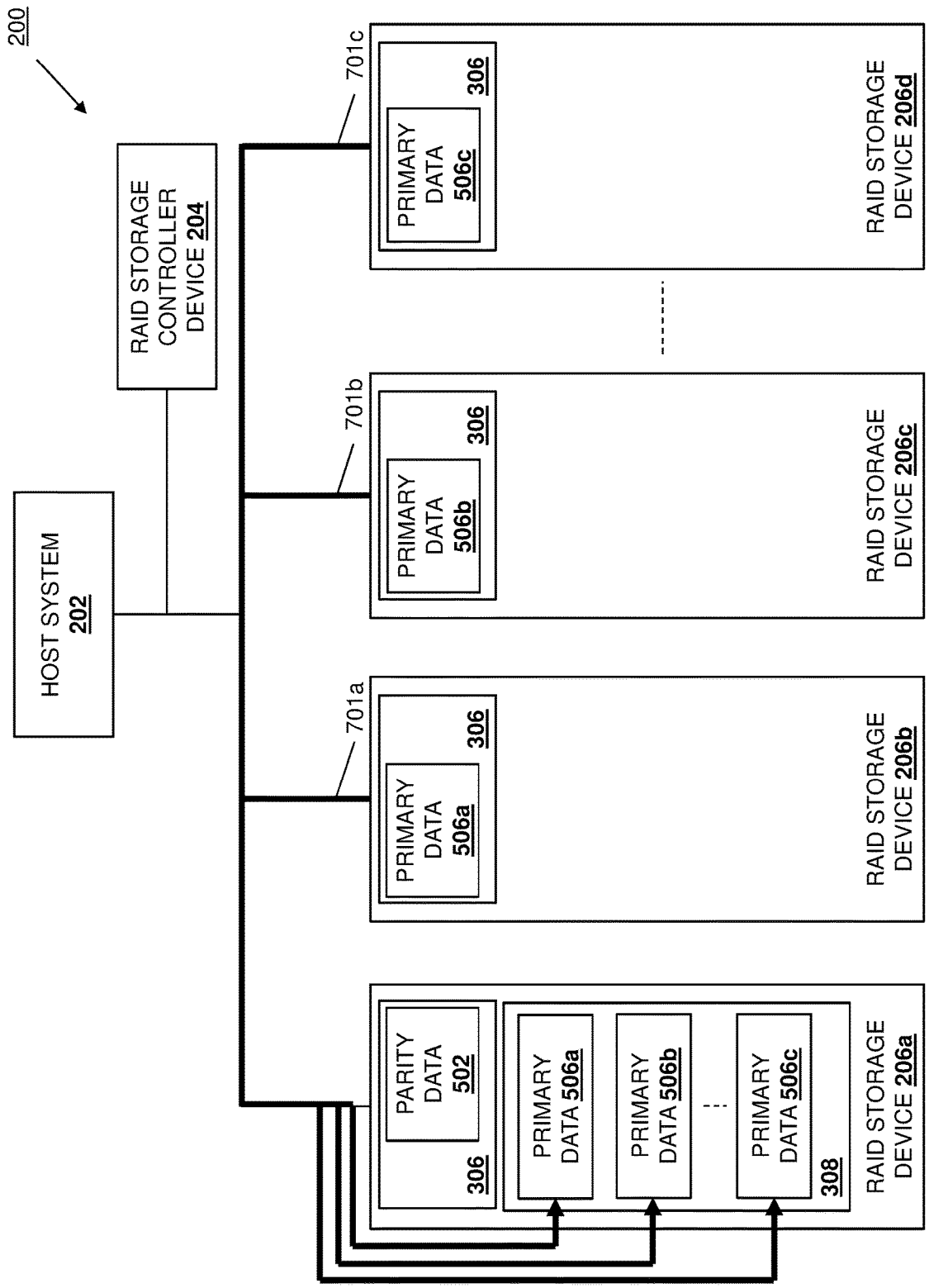
FIG. 7B is a schematic view illustrating an embodiment of the RAID storage system of FIG. 2 operating during the method of FIG. 4.

Similarly, as illustrated in FIG. 7B, the RAID storage engine 304 in the RAID storage device 206c/300 may retrieve the parity data update command 700b from the submission queue in its communication system 310 and, in response, may execute that parity data update command 700b to retrieve the primary data 506b from its storage subsystem 306 and perform a DMA operation 701b to provide that primary data 506b in the buffer subsystem 308 (e.g., the CMB) in the RAID storage device 206a that is identified in the parity data update command 700b. Similarly, as illustrated in FIG. 7B, the RAID storage engine 304 in the RAID storage device 206d/300 may retrieve the parity data update command 700c from the submission queue in its communication system 310 and, in response, may execute that parity data update command 700c to retrieve the primary data 506c from its storage subsystem 306 and perform a DMA operation 701c to provide that primary data 506c in the buffer subsystem 308 (e.g., the CMB) in the RAID storage device 206a that is identified in the parity data update command 700c. However, one of skill in the art in possession of the present disclosure will recognize that parity data update situations that involve partial stripe writes may involve only the RAID storage devices to which new primary data was written retrieving that new primary data and performing DMA operations to provide that new primary data to the buffer subsystem in the RAID storage device that requires the parity data update.

Continuing with the example of the primary data update situation discussed above with reference to FIGS. 6A, 6B, and 8A, at block 406 and in response to the RAID storage controller device 204 ringing their doorbells, each of the RAID storage devices 206b-206d may retrieve the read/parity data update commands 800a, 800b, and 800c, respectively, from their submission queues in their communication system 310, and execute their respective parity data update command 800a, 800b, and 800c. For example, as illustrated in FIG. 8B, the RAID storage engine 304 in the RAID storage device 206b/300 may retrieve the primary data update command 800a from the submission queue in its communication system 310 and, in response, may execute that primary data update command 800a to retrieve the primary data 600b from its storage subsystem 306 and perform a DMA operation 801a to provide that primary data 600b in the buffer subsystem 308 (e.g., the CMB) in the RAID storage device 606 that is identified in the primary data update command 800a.

Figure 8B:
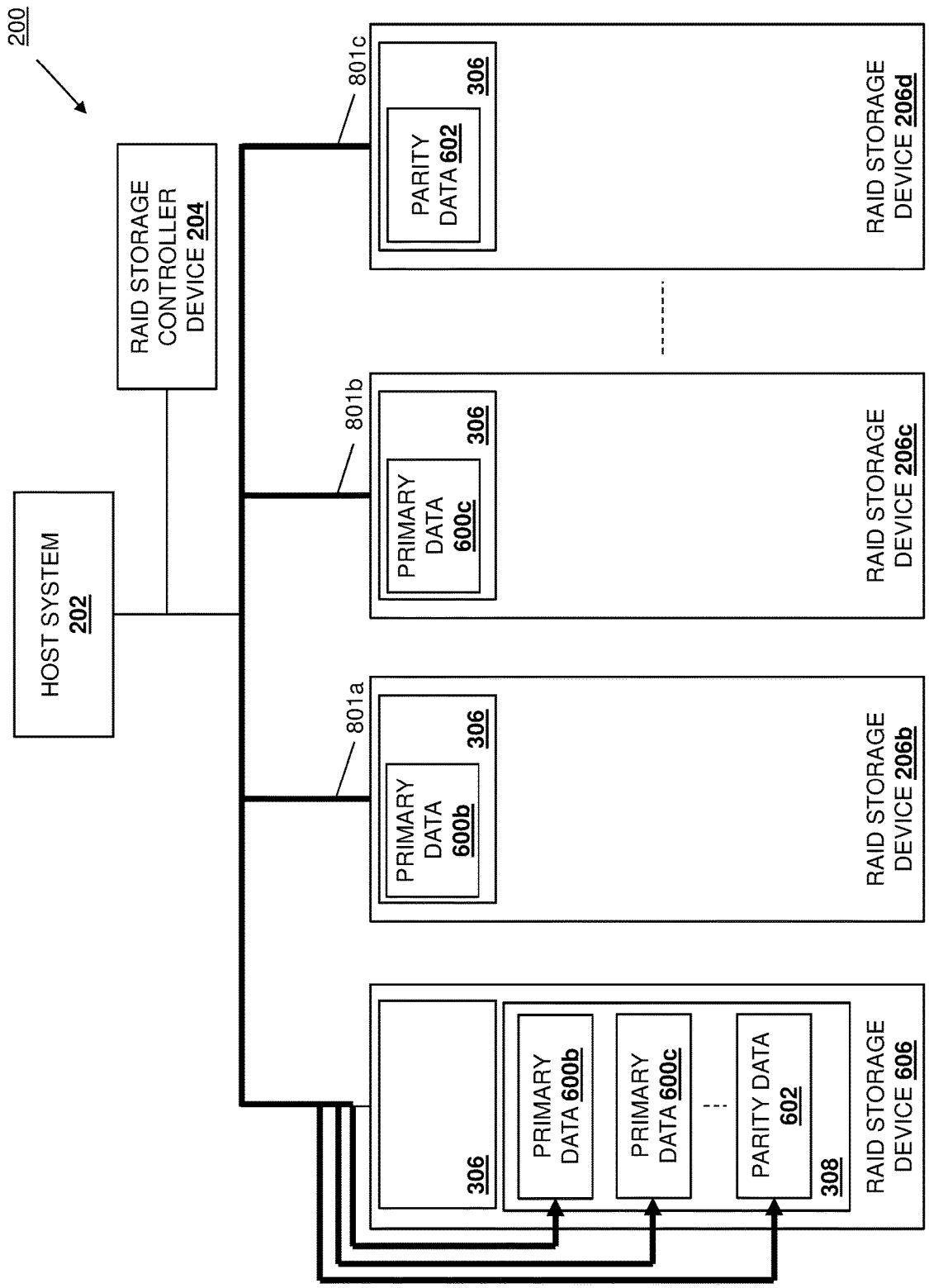
FIG. 8B is a schematic view illustrating an embodiment of the RAID storage system of FIG. 2 operating during the method of FIG. 4.

Similarly, as illustrated in FIG. 8B, the RAID storage engine 304 in the RAID storage device 206c/300 may retrieve the primary data update command 800b from the submission queue in its communication system 310 and, in response, may execute that primary data update command 800b to retrieve the primary data 600c from its storage subsystem 306 and perform a DMA operation 801b to provide that primary data 600c in the buffer subsystem 308 (e.g., the CMB) in the RAID storage device 606 that is identified in the primary data update command 800b. Similarly, as illustrated in FIG. 8B, the RAID storage engine 304 in the RAID storage device 206d/300 may retrieve the primary data update command 800c from the submission queue in its communication system 310 and, in response, may execute that primary data update command 800c to retrieve the parity data 602 from its storage subsystem 306 and perform a DMA operation 801c to provide that parity data 602 in the buffer subsystem 308 (e.g., the CMB) in the RAID storage device 606 that is identified in the primary data update command 800c.

The method 400 then proceeds to block 408 where the first RAID storage devices provide completion messages to the RAID storage controller device. Continuing with the example of the parity data update situation discussed above with reference to FIGS. 5A, 5B, 7A, and 7B that involves a full stripe write, at block 408, the RAID storage engine 304 in each of the RAID storage devices 206b-206d may generate and transmit a completion message via its communication system 310 to the RAID storage controller device 204. For example, as illustrated in FIG. 7C and in response to providing the primary data 506a in the buffer subsystem 308 in the RAID storage device 206a, the RAID storage engine 304 in the RAID storage device 206b/300 may generate a completion message 702a and transmit that completion message 702a via its communication system 310 to the RAID storage controller device 204 by, for example, submitting the completion message 702a to a completion queue in its communication system 310.

Figure 7C:
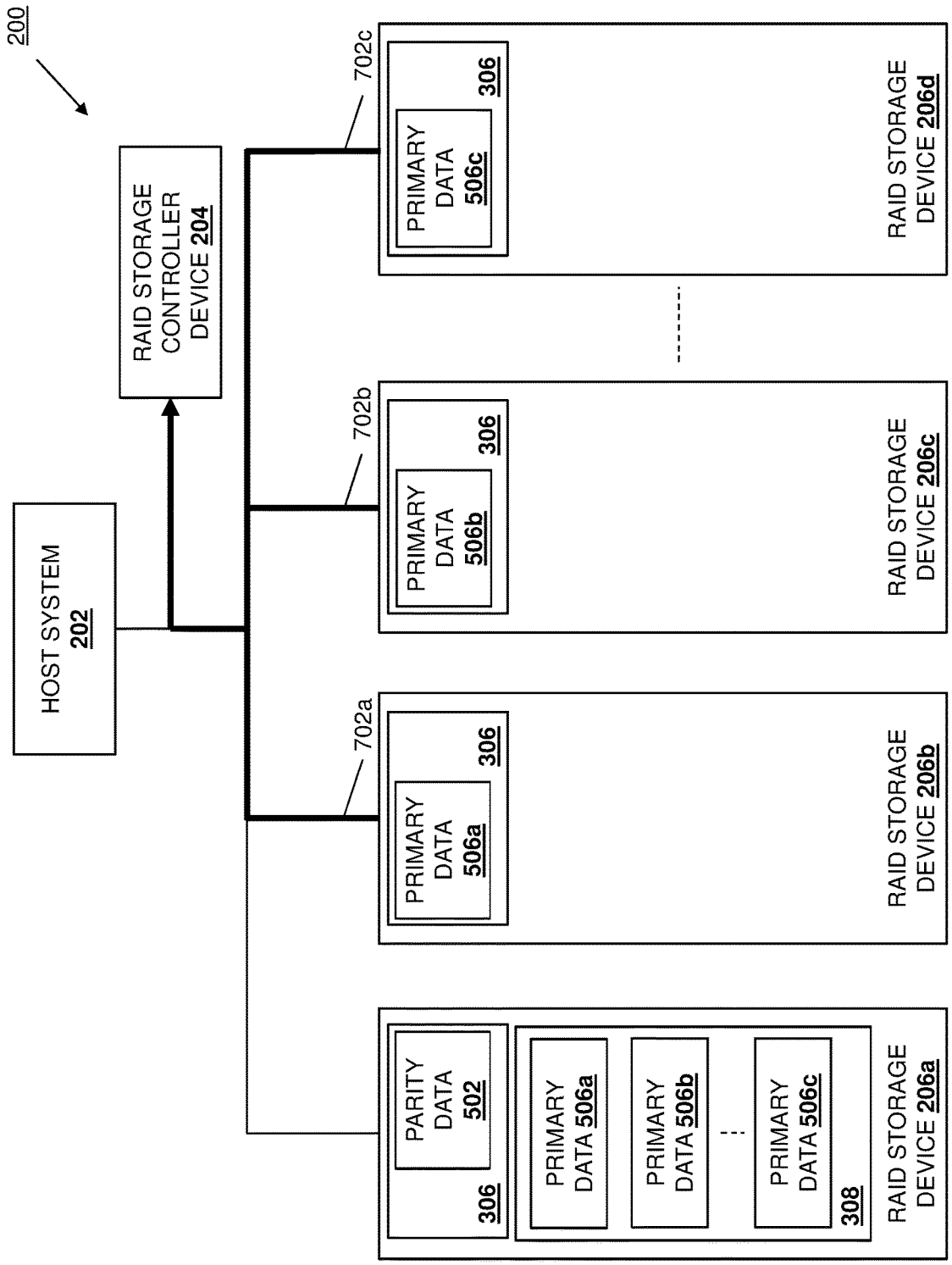
FIG. 7C is a schematic view illustrating an embodiment of the RAID storage system of FIG. 2 operating during the method of FIG. 4.

Similarly, as illustrated in FIG. 7C and in response to providing the primary data 506b in the buffer subsystem 308 in the RAID storage device 206a, the RAID storage engine 304 in the RAID storage device 206c/300 may generate a completion message 702b and transmit that completion message 702b via its communication system 310 to the RAID storage controller device 204 by, for example, submitting the completion message 702b to a completion queue in its communication system 310. Similarly, as illustrated in FIG. 7C and in response to providing the primary data 506c in the buffer subsystem 308 in the RAID storage device 206a, the RAID storage engine 304 in the RAID storage device 206d/300 may generate a completion message 702c and transmit that completion message 702c via its communication system 310 to the RAID storage controller device 204 by, for example, submitting the completion message 702c to a completion queue in its communication system 310. However, one of skill in the art in possession of the present disclosure will recognize that parity data update situations that involve partial stripe writes may involve only the RAID storage devices that provided its new primary data to the buffer subsystem in the RAID storage device that requires the parity data update to provide a completion message.

Continuing with the example of the primary data update situation discussed above with reference to FIGS. 6A, 6B, 8A, and 8B, at block 408, the RAID storage engine 304 in each of the RAID storage devices 206b-206d may generate a completion message 802a and transmit that completion message 802a via its communication system 310 to the RAID storage controller device 204 by, for example, submitting the completion message 802a to a completion queue in its communication system 310. For example, as illustrated in FIG. 8C and in response to providing the primary data 600b in the buffer subsystem 308 in the RAID storage device 606, the RAID storage engine 304 in the RAID storage device 206b/300 may generate a completion message 802a and transmit that completion message 802a via its communication system 310 to the RAID storage controller device 204 by, for example, submitting the completion message 802a to a completion queue in its communication system 310.

Figure 8C:
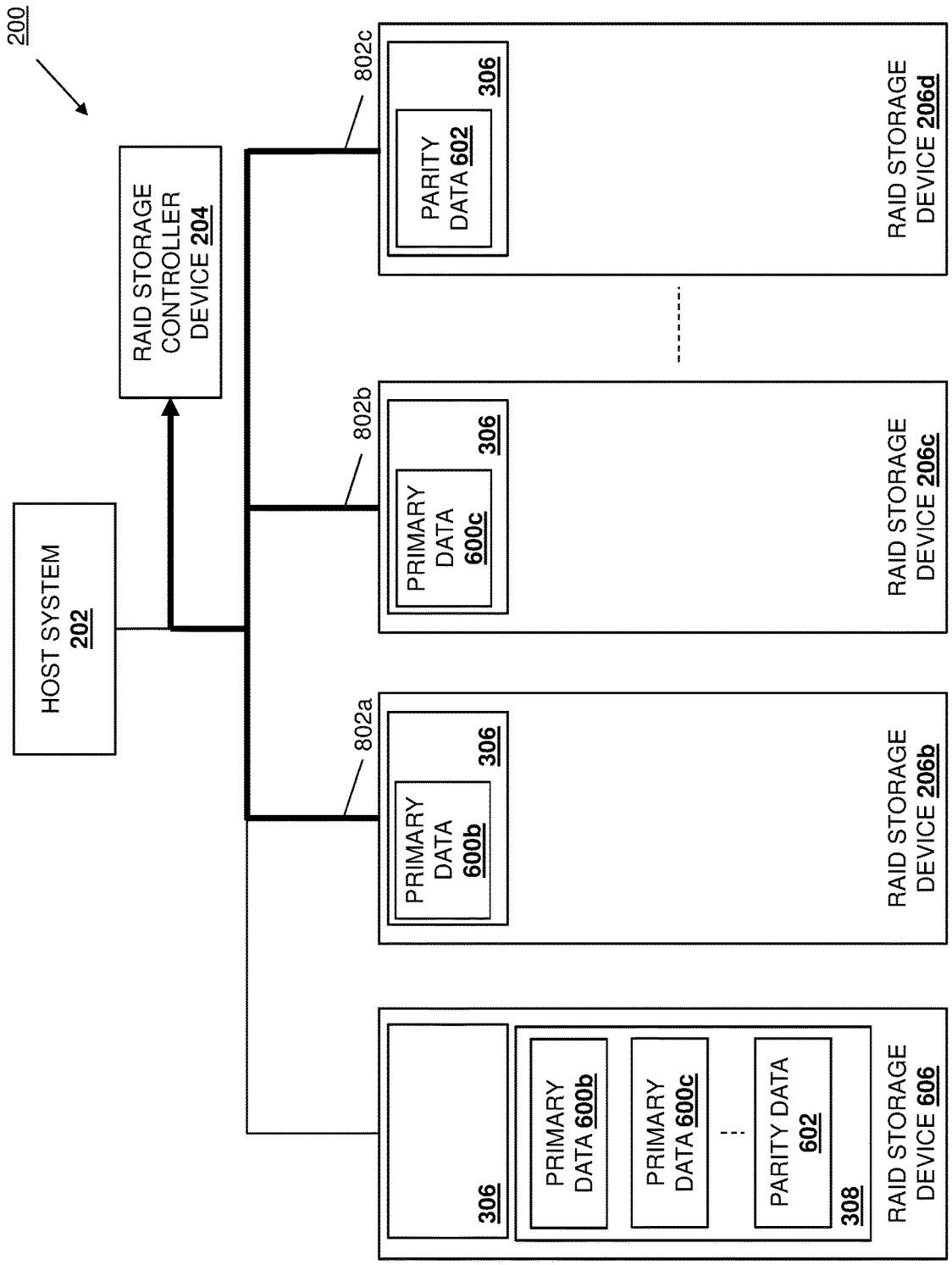
FIG. 8C is a schematic view illustrating an embodiment of the RAID storage system of FIG. 2 operating during the method of FIG. 4.

Similarly, as illustrated in FIG. 8C and in response to providing the primary data 600c in the buffer subsystem 308 in the RAID storage device 606, the RAID storage engine 304 in the RAID storage device 206c/300 may generate a completion message 802b and transmit that completion message 802b via its communication system 310 to the RAID storage controller device 204 by, for example, submitting the completion message 802b to a completion queue in its communication system 310. Similarly, as illustrated in FIG. 8C and in response to providing the parity data 602 in the buffer subsystem 308 in the RAID storage device 606, the RAID storage engine 304 in the RAID storage device 206d/300 may generate a completion message 802c and transmit that completion message 802c via its communication system 310 to the RAID storage controller device 204 by, for example, submitting the completion message 802c to a completion queue in its communication system 310.

Figure 7D:
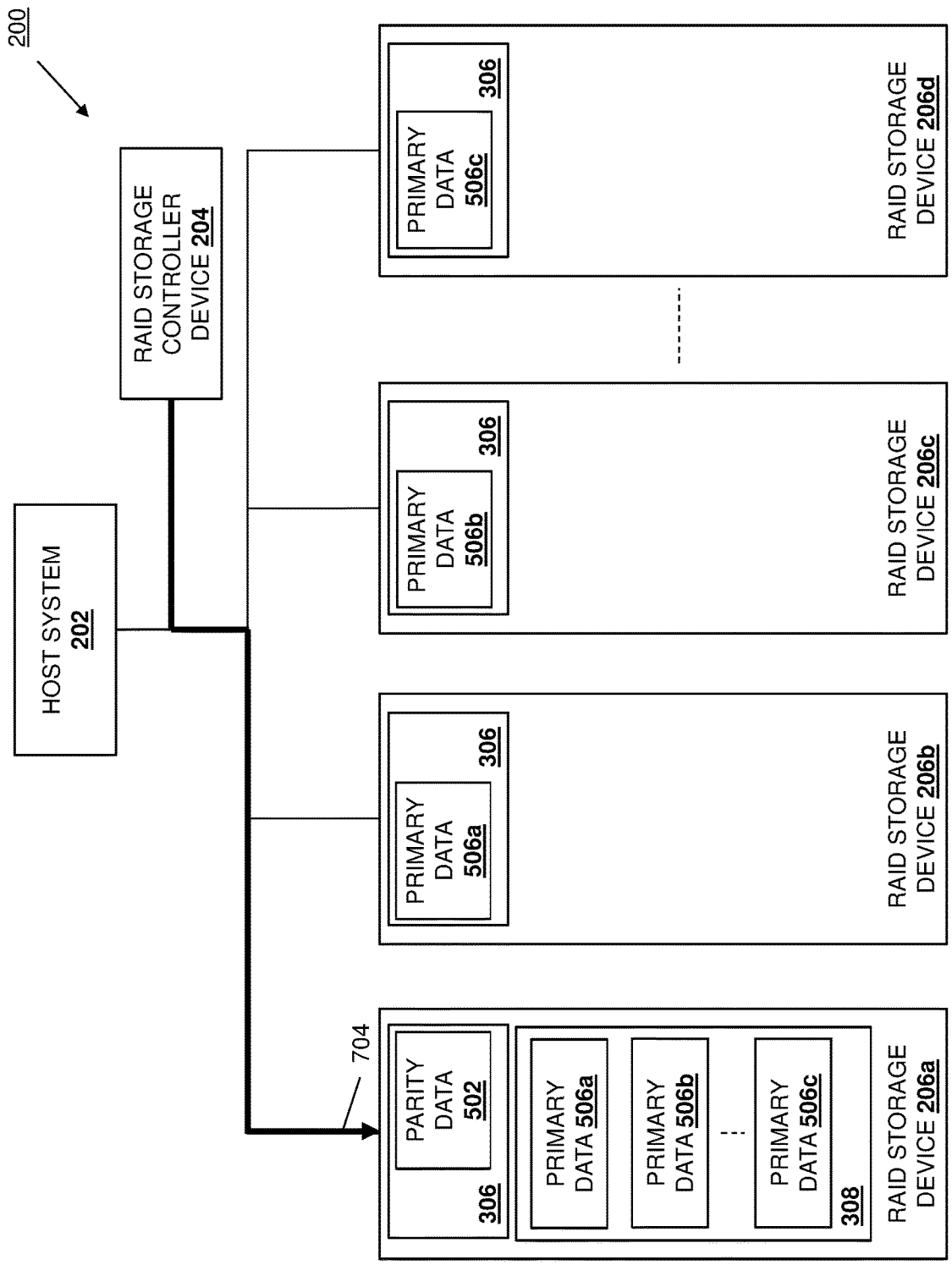
FIG. 7D is a schematic view illustrating an embodiment of the RAID storage system of FIG. 2 operating during the method of FIG. 4.

The method 400 then proceeds to block 410 where the RAID storage controller provides the second RAID storage device a command to perform a data update. In an embodiment, at block 410, the RAID storage controller device 204 may wait until completion messages have been received from each of the first RAID storage devices to which the command was provided at block 404 and, upon receiving completion messages from each of those first RAID storage devices, the RAID storage controller device 204 will send a command to perform a data update to a second RAID storage device. For example, with reference to FIG. 7D, and continuing with the example of the parity data update situation discussed above with reference to FIGS. 5A, 5B, 7A, 7B, and 7C that involves a full stripe write, at block 410 the RAID storage controller device 204 may determine that the completion messages 702a-702c were received from each of the RAID storage devices 206b-206d to which the parity data update command was sent at block 404 (e.g., provided in the completion queues of the communication systems 310 in those RAID storage devices 206b-206d/300). In response, the RAID storage controller device 204 will generate a data update command 704 and transmit that data update command 704 to the RAID storage device 206a by, for example, submitting the data update command 704 in the submission queue of the RAID storage device 206a, and then ringing the doorbell of the RAID storage device 206a.

Figure 8D:
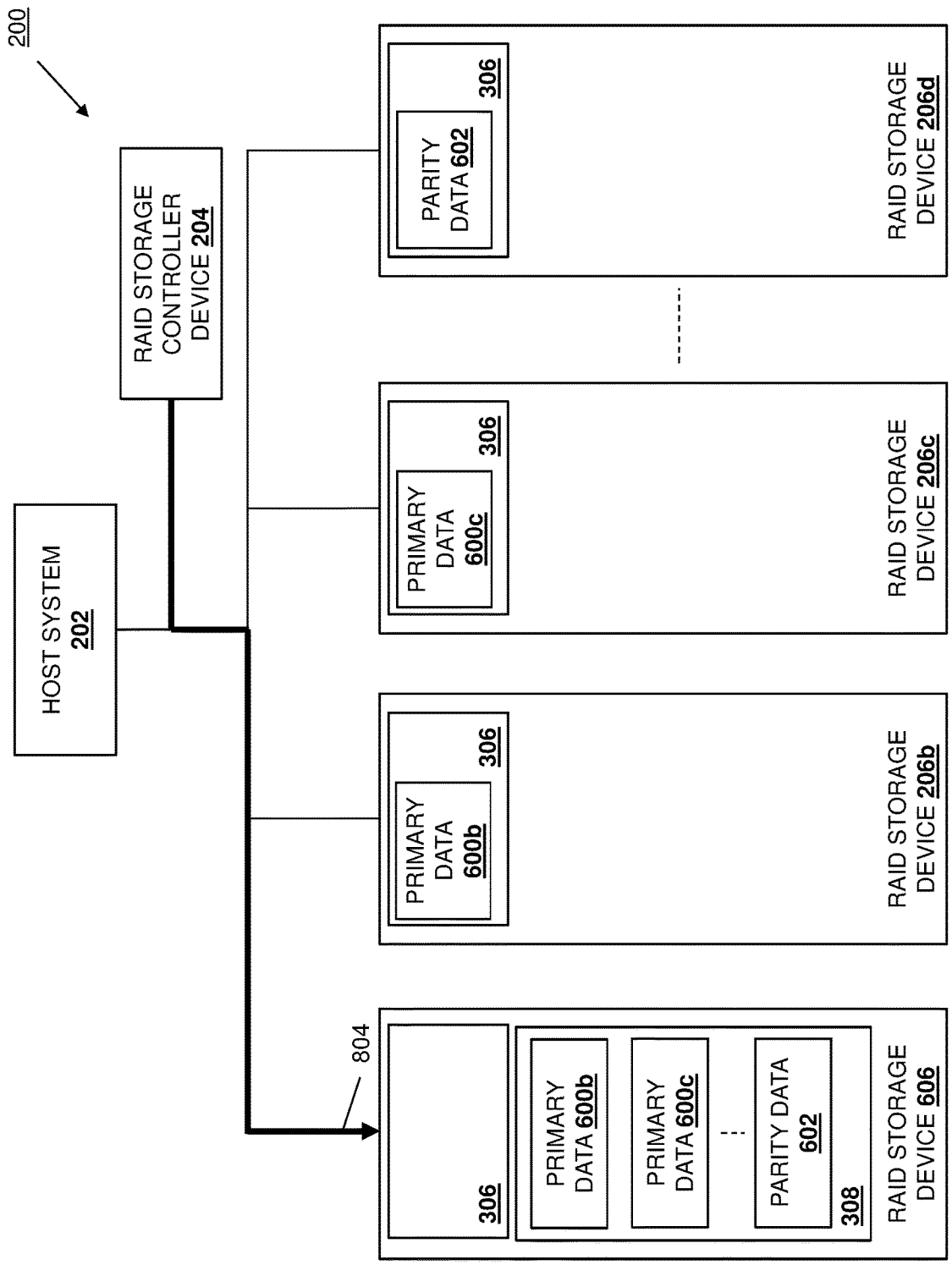
FIG. 8D is a schematic view illustrating an embodiment of the RAID storage system of FIG. 2 operating during the method of FIG. 4.

Similarly, with reference to FIG. 8D, and continuing with the example of the primary data update situation discussed above with reference to FIGS. 6A, 6B, 8A, 8B, and 8C, at block 410 the RAID storage controller device 204 may determine that the completion messages 802a-802c were received from each of the RAID storage devices 206b-206d to which the primary data update command was sent at block 404 (e.g., provided in the completion queues of the communication systems 310 in those RAID storage devices 206b-206d/300). In response, the RAID storage controller device 204 will generate a data update command 804 and transmit that data update command 804 to the RAID storage device 606 by, for example, submitting the data update command 804 in the submission queue of the RAID storage device 606, and then ringing the doorbell of the RAID storage device 606.

Figure 7E:
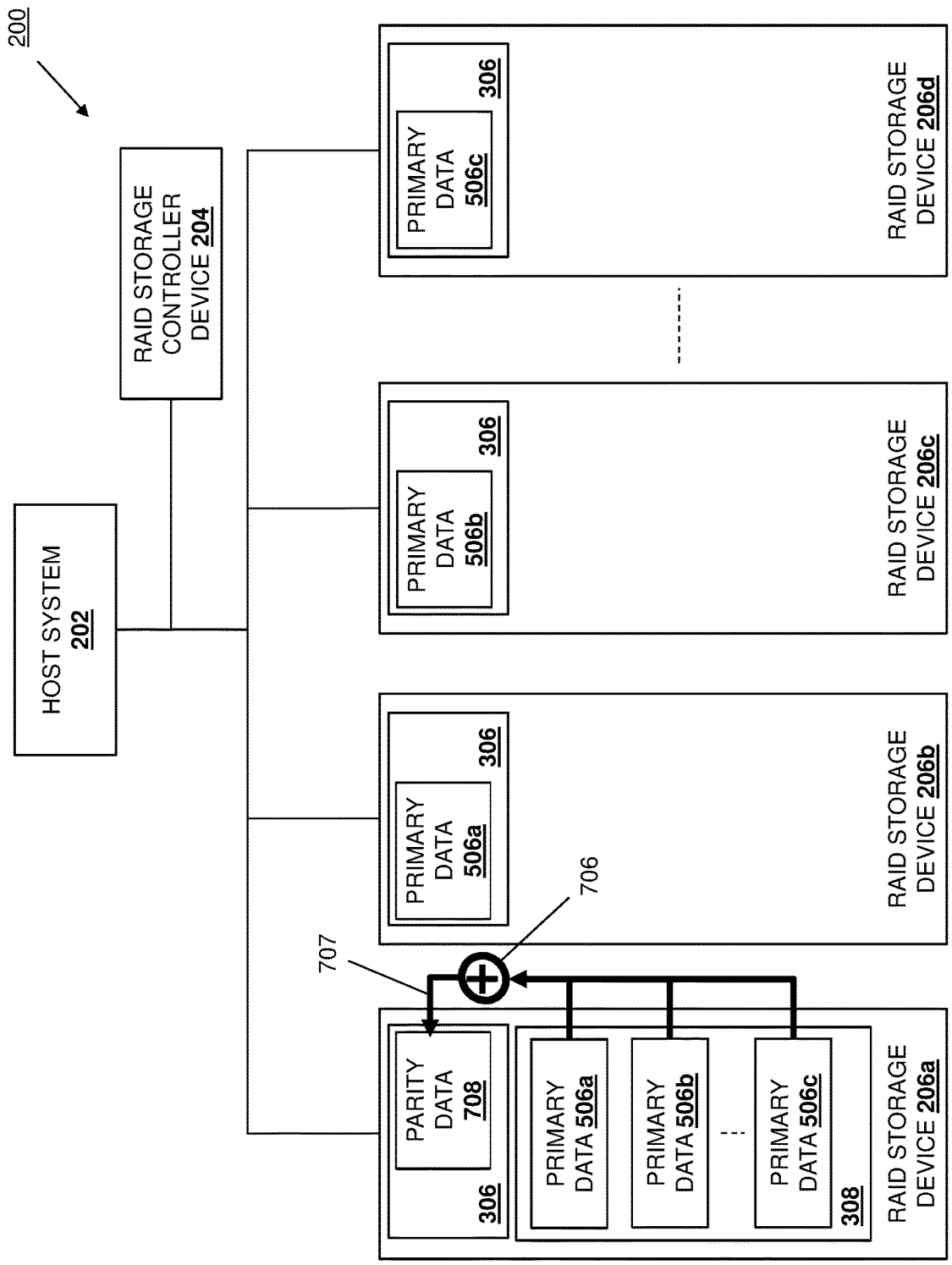
FIG. 7E is a schematic view illustrating an embodiment of the RAID storage system of FIG. 2 operating during the method of FIG. 4.

The method 400 then proceeds to block 412 where the second RAID storage device performs an XOR operation using the first RAID storage device data provided in the second RAID storage device buffer subsystem to produce update data, and then to block 414 where the second RAID storage device provides the update data in a second RAID storage device storage subsystem in the second RAID storage device. For example, with reference to FIG. 7E and continuing with the example of the parity data update situation discussed above with reference to FIGS. 5A, 5B, 7A, 7B, 7C, and 7D that involves a full stripe write, at block 412 the RAID storage engine 304 in the RAID storage device 206a/300 may retrieve the primary data 506a, the primary data 506b, and the primary data 506c from its buffer subsystem 308, and then perform an XOR operation 706 on the primary data 506a, the primary data 506b, and the primary data 506c. As will be appreciated by one of skill in the art in possession of the present disclosure, the performance of the XOR operation 706 on the primary data 506a, the primary data 506b, and the primary data 506c operates to produce parity data 708 that, as discussed above, may be subsequently used to regenerate any one of the primary data 506a, the primary data 506b, and the primary data 506c in the event it becomes unavailable. As illustrated in FIG. 7E, at block 414, the RAID storage engine 304 in the RAID storage device 206a operates to perform a write operation 707 to store the parity data 708 in its storage subsystem 306.

Figure 8E:
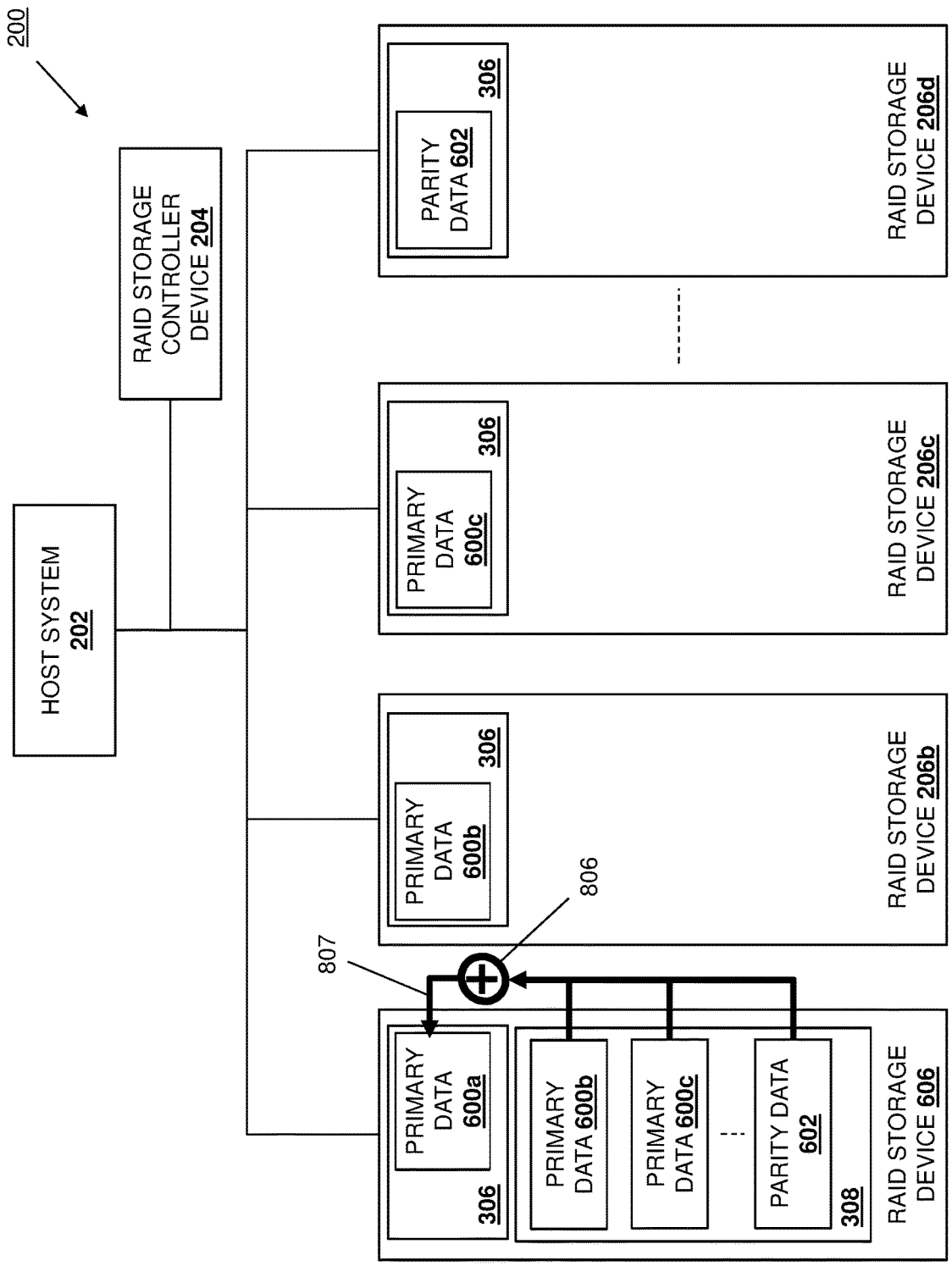
FIG. 8E is a schematic view illustrating an embodiment of the RAID storage system of FIG. 2 operating during the method of FIG. 4.

Similarly, with reference to FIG. 8E and continuing with the example of the primary data update situation discussed above with reference to FIGS. 6A, 6B, 8A, 8B, 8C, and 8D, at block 412 the RAID storage engine 304 in the RAID storage device 606/300 may retrieve the primary data 600b, the primary data 600c, and the parity data 602 from its buffer subsystem 308, and then perform an XOR operation 806 on the primary data 600b, the primary data 600c, and the parity data 602. As will be appreciated by one of skill in the art in possession of the present disclosure, the performance of the XOR operation 806 on the primary data 600b, the primary data 600c, and the parity data 602 operates to produce the primary data 600a that became unavailable due to the failure of the RAID storage device 206a discussed above. As illustrated in FIG. 8E, at block 414, the RAID storage engine 304 in the RAID storage device 606 operates to perform a write operation 807 to store the primary data 600a in its storage subsystem 306.

Figure 7F:
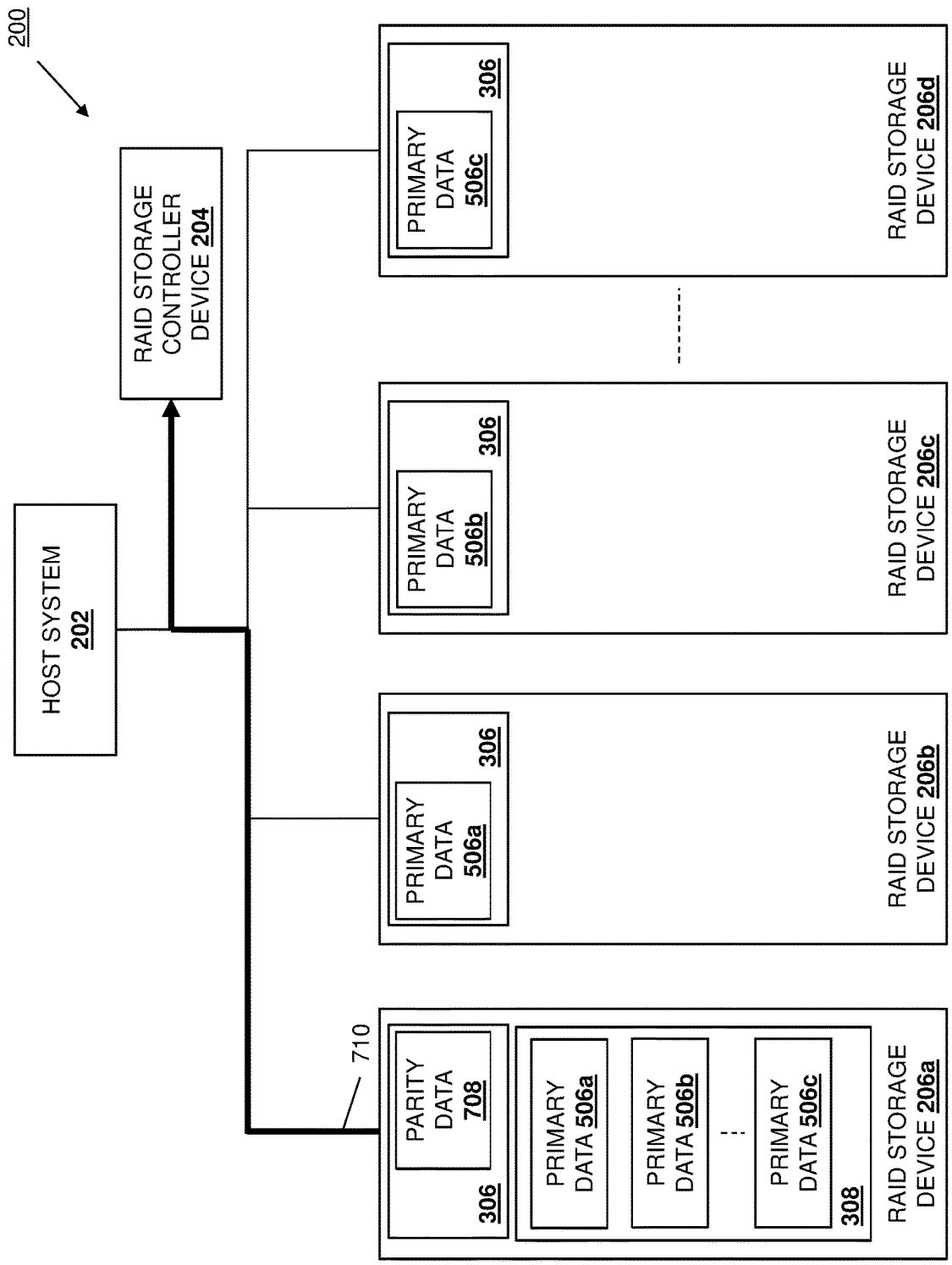
FIG. 7F is a schematic view illustrating an embodiment of the RAID storage system of FIG. 2 operating during the method of FIG. 4.
Figure 8F:
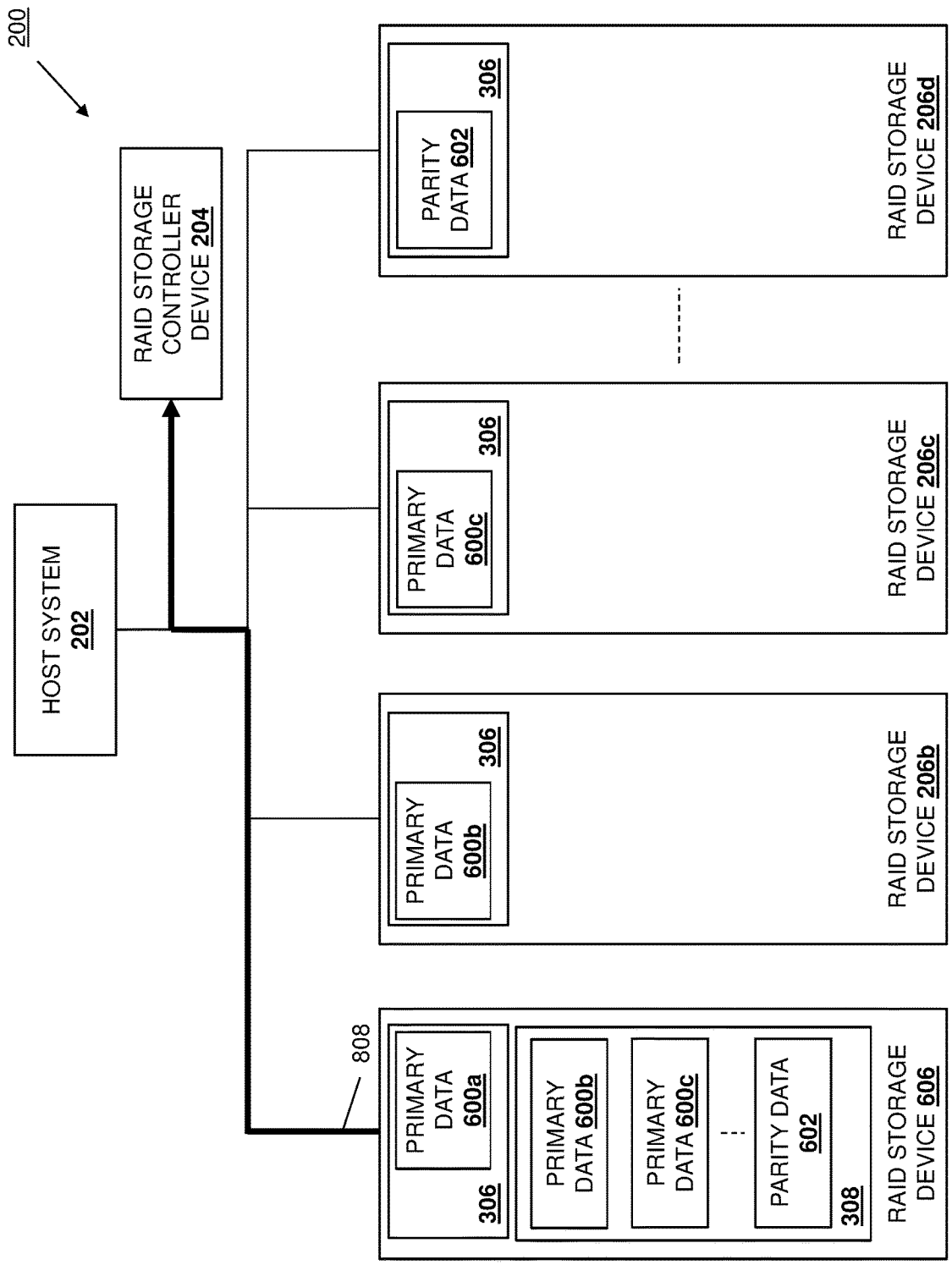
FIG. 8F is a schematic view illustrating an embodiment of the RAID storage system of FIG. 2 operating during the method of FIG. 4.

The method 400 then proceeds to block 416 where the second RAID storage device provides a completion message to the RAID storage controller device. Continuing with the example of the parity data update situation discussed above with reference to FIGS. 5A, 5B, 7A, 7B, 7C, 7D, and 7E that involves a full stripe write, at block 416, the RAID storage engine 304 in the RAID storage device 206a may generate and transmit a completion message via its communication system 310 to the RAID storage controller device 204. For example, as illustrated in FIG. 7F and in response to providing the parity data 708 in the storage subsystem 308 in the RAID storage device 206a, the RAID storage engine 304 in the RAID storage device 206a/300 may generate a completion message 710 and transmit that completion message 710 via its communication system 310 to the RAID storage controller device 204 by, for example, submitting the completion message 710 to a completion queue in its communication system 310. As will be appreciated by one of skill in the art in possession of the present disclosure, the RAID storage controller device 204 may confirm the provisioning of the parity data 708 in the storage subsystem 306 of the RAID storage device 206a via the completion message 710 in the completion queue of the communication system 310 in the RAID storage device 206a, which completes the parity data update operation Continuing with the example of the primary data update situation discussed above with reference to FIGS. 6A, 6B, 8A, 8B, 8C, 8D, and 8E, at block 416, the RAID storage engine 304 in the RAID storage device 206a may generate and transmit a completion message via its communication system 310 to the RAID storage controller device 204. For example, as illustrated in FIG. 8F and in response to providing the primary data 600a in the storage subsystem 306 in the RAID storage device 606, the RAID storage engine 304 in the RAID storage device 606/300 may generate a completion message 808 and transmit that completion message 808 via its communication system 310 to the RAID storage controller device 204 by, for example, submitting the completion message 808 to a completion queue in its communication system 310. As will be appreciated by one of skill in the art in possession of the present disclosure, the RAID storage controller device 204 may confirm the provisioning of the primary data 600a in the storage subsystem 306 of the RAID storage device 206a via the completion message 808 in the completion queue of the communication system 310 in the RAID storage device 206a, which completes the primary data update operation.

Figure 9A:
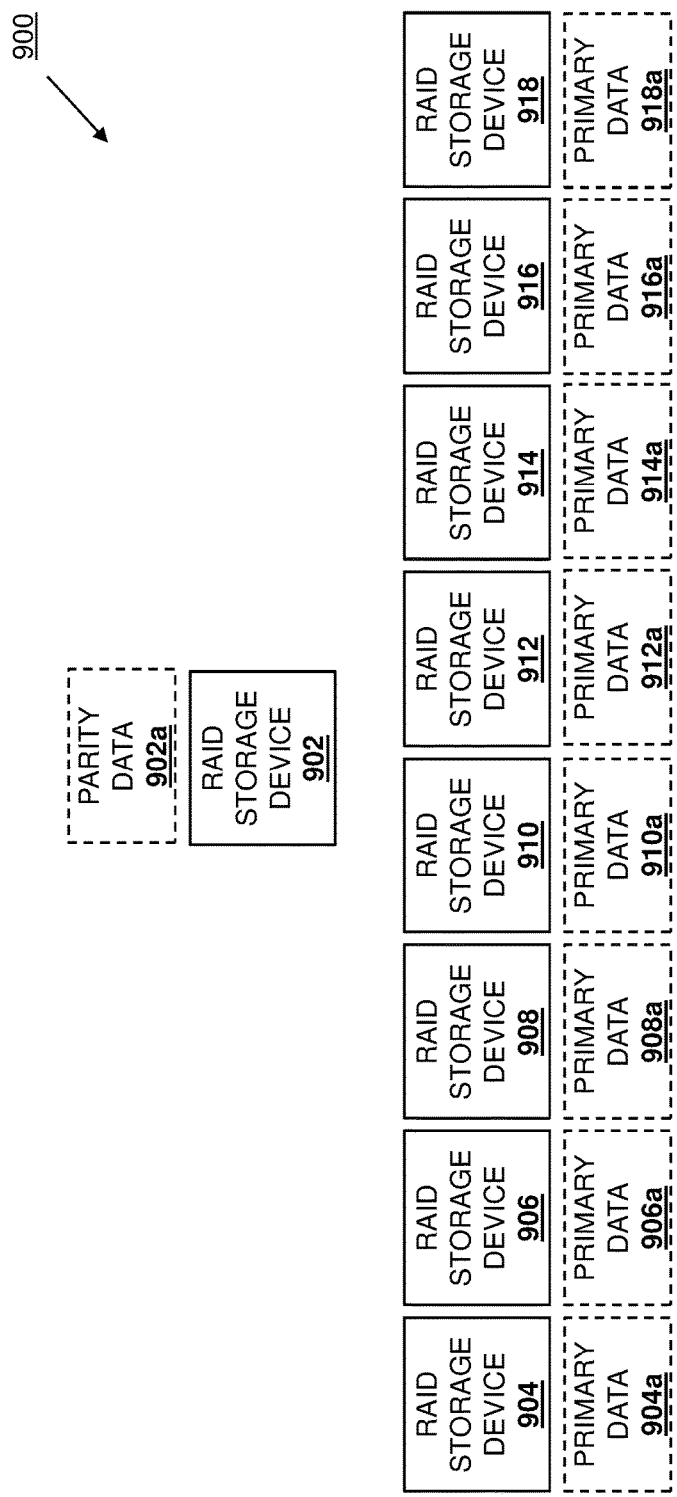
FIG. 9A is a schematic view illustrating an embodiment of a plurality of RAID storage devices prior to performing parity data update operations according to the teachings of the present disclosure.

Referring now to FIGS. 9A, 9B, 9C, and 9D, the inventors of the present disclosure have discovered that the efficiency of the RAID storage-device-assisted data updates described above can be increased in the parity data update situations discussed above. For example, FIG. 9A illustrates a RAID storage system 900 with a RAID storage device 902 that one of skill in the art in possession of the present disclosure will recognize operates in the RAID storage system 900 as a parity data RAID storage device (e.g., a "parity drive") and thus stores parity data 902a in its storage subsystem 306. Furthermore, the RAID storage system 900 includes RAID storage devices 904, 906, 908, 910, 912, 914, 916, and 918 that each operate as primary data RAID storage devices (e.g., "data drives"), and thus each store primary data 904a, 906a, 908a, 910a, 912a, 914a, 916a, and 918a, respectively, in its storage subsystem 306. In the example provided below, the RAID storage devices 904-918 have experienced a full stripe write such that each of the primary data 904a-918a in their respective storage subsystems 306 is new, and thus the parity data 902a stored in the storage subsystem 306 in the RAID storage device 902 must be updated as described above.

In the examples described above, the update of the parity data 902a in the RAID storage device 902 would be accomplished by having each of the RAID storage devices 904-918 perform respective DMA operations to provide their respective primary data 904a-918a stored in their storage subsystems 306 in the buffer subsystem 308 in the RAID storage device 902, follows by the RAID storage device 902 performing an XOR operation on that primary data 904a-918a in order to produce updated parity data to replace the parity data 902a. As would be appreciated by one of skill in the art in possession of the present disclosure, such an update of the parity data 902a in the example illustrated in FIG. 9A would require eight DMA operations (e.g., one by each of the RAID storage devices 904-918), with those DMA operations being performed sequentially (e.g., a first DMA operation would be performed by the RAID storage device 904 to provide the primary data 904a on the RAID storage device 902, a second DMA operation would be performed by the RAID storage device 906 to provide the primary data 906a on the RAID storage device 902, and so on), followed by an XOR operation on the respective data transferred via those DMA operations.

However, the RAID storage-drive-assisted data update system of the present disclosure takes advantage of the fact that the XOR operations discussed above are distributive, which allows pairs of RAID storage devices to perform XOR operations on subsets of the primary data to produce first interim parity data, and then perform XOR operations on the first interim parity data to produce second interim parity data, and so on until the final parity data is determined. As discussed below, parity data updates in this manner allow parallel DMA operations by the RAID storage devices that reduce the time needed to produce the new parity data.

Figure 9B:
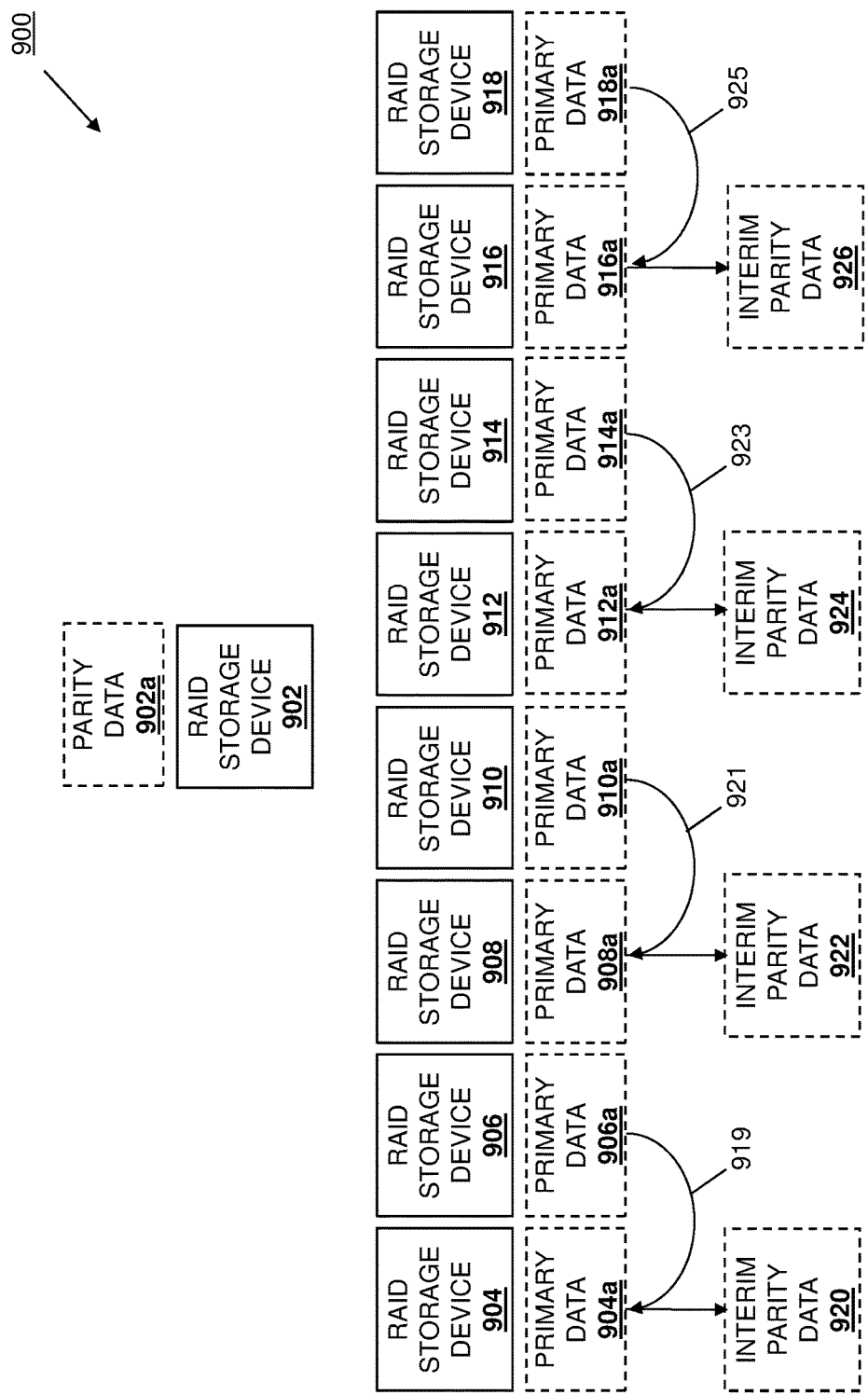
FIG. 9B is a schematic view illustrating an embodiment of the plurality of RAID storage devices of FIG. 9A performing first interim parity data update operations according to the teachings of the present disclosure.

For example, FIG. 9B illustrates how the RAID storage device 906 may perform a DMA operation 919 to provide the primary data 906a in its storage subsystem 306 on the buffer subsystem 308 in the RAID storage device 904, and the RAID storage device 904 may perform an XOR operation on the primary data 904a and the primary data 906a to produce interim parity data 920. Similarly, FIG. 9B illustrates how the RAID storage device 910 may perform a DMA operation 921 to provide the primary data 910a in its storage subsystem 306 on the buffer subsystem 308 in the RAID storage device 908, and the RAID storage device 908 may perform an XOR operation on the primary data 908a and the primary data 910a to produce interim parity data 922. Similarly, FIG. 9B illustrates how the RAID storage device 914 may perform a DMA operation 923 to provide the primary data 914a in its storage subsystem 306 on the buffer subsystem 308 in the RAID storage device 912, and the RAID storage device 912 may perform an XOR operation on the primary data 912a and the primary data 914a to produce interim parity data 924. Similarly, FIG. 9B illustrates how the RAID storage device 918 may perform a DMA operation 925 to provide the primary data 918a in its storage subsystem 306 on the buffer subsystem 308 in the RAID storage device 916, and the RAID storage device 916 may perform an XOR operation on the primary data 916a and the primary data 918a to produce interim parity data 926. One of skill in the art in possession of the present disclosure will appreciate how the DMA operations 919, 921, 923, and 925 illustrated in FIG. 9B may be performed in parallel by the RAID storage devices 906, 910, 914, and 918.

Figure 9C:
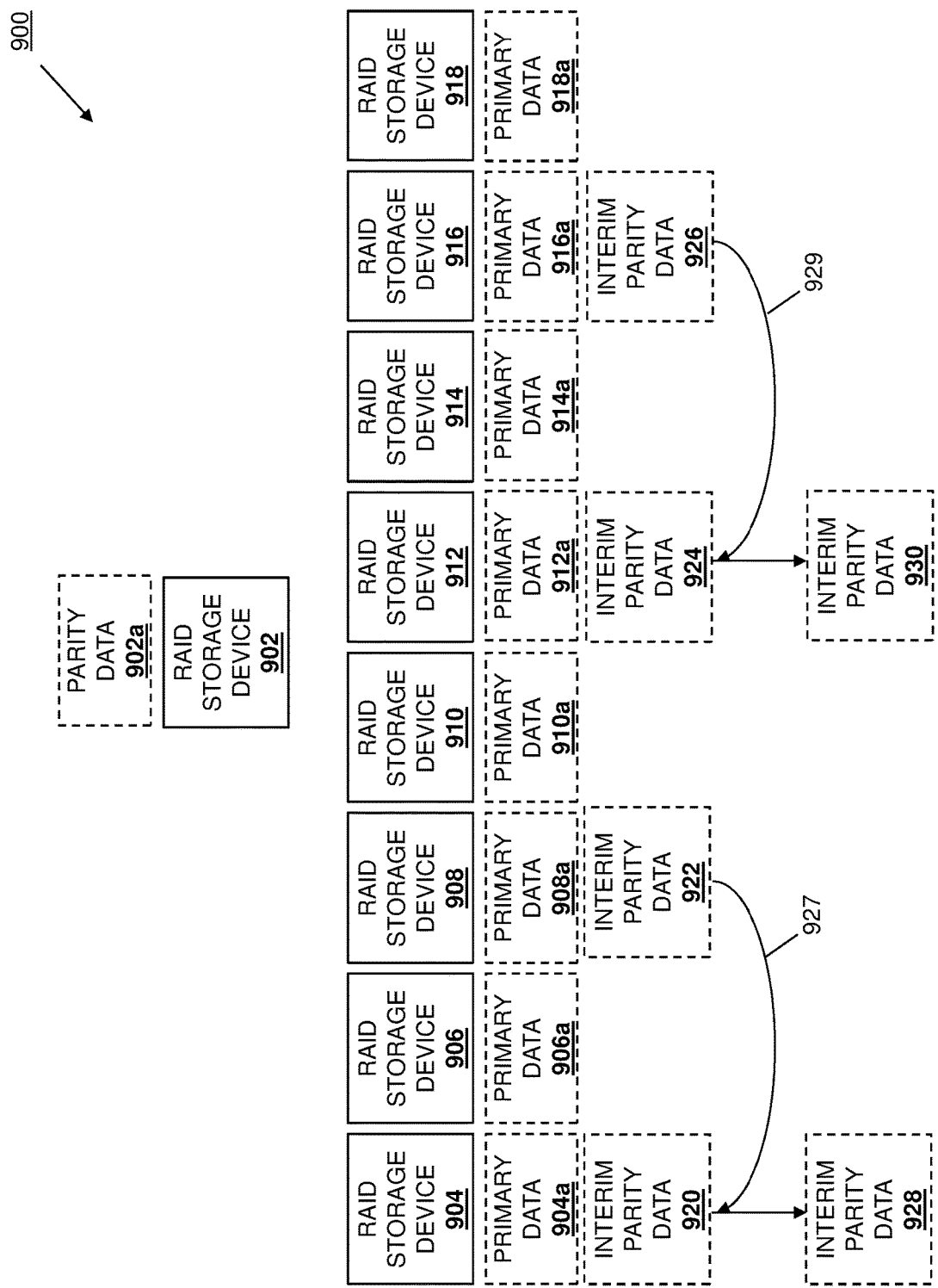
FIG. 9C is a schematic view illustrating an embodiment of the plurality of RAID storage devices of FIG. 9B performing second interim parity data update operations according to the teachings of the present disclosure.

Furthermore, FIG. 9C illustrates how the RAID storage device 908 may perform a DMA operation 927 to provide the interim parity data 922 on the buffer subsystem 308 in the RAID storage device 904, and the RAID storage device 904 may perform an XOR operation on the interim parity data 920 and the interim parity data 922 to produce interim parity data 928. Similarly, FIG. 9C illustrates how the RAID storage device 916 may perform a DMA operation 929 to provide the interim parity data 926 on the buffer subsystem 308 in the RAID storage device 912, and the RAID storage device 912 may perform an XOR operation on the interim parity data 924 and the interim parity data 926 to produce interim parity data 930. In some embodiments, the interim parity data 920, 922, 924, and 926 may each be considered "first interim parity data" that is generated via XOR operations on subsets of the primary data 904a-918a, while the interim parity data 928 and 930 may be considered "second interim parity data" that is generated via XOR operations on the first interim parity data, and one of skill in the art in possession of the present disclosure will recognize how additional levels of interim parity data (e.g., "third interim parity data", and so on) may be produced depending on the number of RAID storage devices in the RAID storage system.

Figure 9D:
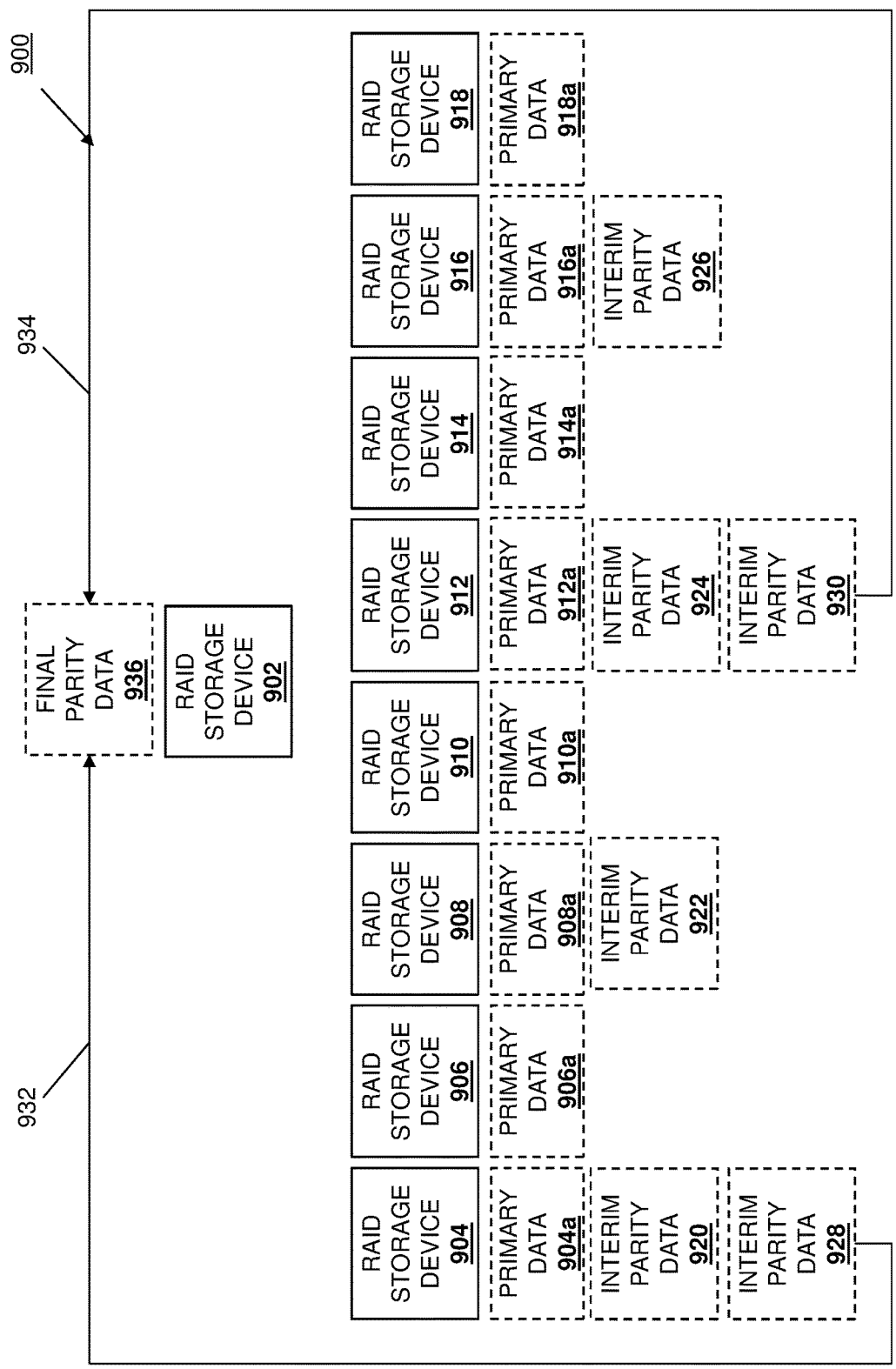
FIG. 9D is a schematic view illustrating an embodiment of the plurality of RAID storage devices of FIG. 9C performing final parity data update operations according to the teachings of the present disclosure.

FIG. 9D illustrates how the RAID storage device 904 may perform a DMA operation 932 to provide the interim parity data 928 on the buffer subsystem 308 in the RAID storage device 902, the RAID storage device 912 may perform a DMA operation 934 to provide the interim parity data 930 on the buffer subsystem 308 in the RAID storage device 902, and the RAID storage device 902 may perform an XOR operation on the interim parity data 928 and the interim parity data 930 to produce final parity data 936. As will be appreciated by one of skill in the art in possession of the present disclosure, the final parity data 936 may replace the parity data 902a in the storage subsystem 306 of the RAID storage device 902, and may subsequently be used to recover primary data in the event it becomes unavailable from any one of the RAID storage devices 904-918.

Thus, systems and methods have been described that provide for the updating of data on a first RAID NVMe drive in a RAID storage system in a manner that is assisted by a plurality of second RAID NVMe drives in that RAID storage system. As discussed below, the updating of data performed by the systems and methods of the present disclosure may include parity data updates that are performed when new primary data is provided on one or more of the second RAID NVMe drives, primary data rebuilds when primary data is lost on the first RAID NVMe drive, and/or any other updating of data on any RAID NVMe drives that would be apparent to one of skill in the art in possession of the present disclosure. For example, each of the second RAID NVMe drives may receive a first command from a RAID storage controller device that identifies a CMB in the first RAID NVMe drive as a target memory location and, in response, may retrieve respective second RAID NVMe drive data from the respective NAND flash memory in that second RAID NVMe drive and perform Direct Memory Access (DMA) operations to provide the respective second RAID NVMe drive data on the CMB in the first RAID NVMe drive. The first RAID NVMe drive may then receive a second command from the RAID storage controller device and, in response, may perform an XOR operation using the second RAID NVMe drive data provided in its CMB by each of the plurality of second RAID NVMe drives in order to produce update data, and provide the update data in its NAND flash memory. As such, data update operations are offloaded from the RAID storage controller device, thus increasing the ability of the RAID storage controller device to scale with high performance RAID NVMe drives Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disk (RAID) storage device assisted data update system, comprising:
   a Redundant Array of Independent Disk (RAID) storage controller device;
   a first RAID storage device that is coupled to the RAID storage controller device, wherein the first RAID storage device is configured to:
      receive at least one first command from the RAID storage controller device that identifies a second RAID storage device buffer subsystem as a first target memory location; and
      retrieve, in response to the at least one first command, first RAID storage device data stored in the first RAID storage device and perform Direct Memory Access (DMA) operations to provide the first RAID storage device data to the second RAID storage device buffer subsystem;
   a second RAID storage device that includes the second RAID storage device buffer subsystem, wherein the second RAID storage device is configured to:
      receive at least one second command from the RAID storage controller device that identifies a third RAID storage device buffer subsystem as a second target memory location;
      perform, in response to the at least one second command, a first XOR operation using 1) the first RAID storage device data provided to the second RAID storage device buffer subsystem by the first RAID storage device and 2) second RAID storage device data stored in the second RAID storage device, in order to produce first interim parity data; and
      provide the first interim parity data to the third RAID storage device buffer subsystem; and
   a third RAID storage device that includes the third RAID storage device buffer subsystem, wherein the third RAID storage device is configured to:
      receive at least one third command from the RAID storage controller device;
      perform, in response to the at least one third command, a second XOR operation using 1) third RAID storage device data provided to the third RAID storage device buffer subsystem by a fourth RAID storage device and 2) fourth RAID storage device data stored in the third RAID storage device, in order to produce second interim parity data;
      receive at least one fourth command from the RAID storage controller device; and
      perform, in response to the at least one fourth command, a third XOR operation using 1) the first interim parity data provided to the third RAID storage device buffer subsystem by the second RAID storage device and 2) the second interim parity data in order to produce one of:
         1) third interim parity data, or
         2) final parity data.

2. The system of claim 1, wherein the at least one fourth command identifies a fourth RAID storage device buffer subsystem as a third target memory location, and wherein the third RAID storage device is configured to:
   provide the one of the 1) third interim parity data, or 2) the final parity data, to the fourth RAID storage device buffer subsystem.

3. The system of claim 1, wherein the first RAID storage device data provided to the second RAID storage device buffer subsystem by the first RAID storage device includes:
   primary data stored in the first RAID storage device.

4. The system of claim 1, wherein the first RAID storage device is configured to:
   send, in response to providing the first RAID storage device data on the second RAID storage device buffer subsystem, a completion message to the RAID storage controller device.

5. The system of claim 4, wherein the RAID storage controller device is configured to:
   provide, in response to receiving the completion message from the first RAID storage device, the at least one second command to the second RAID storage device.

6. The system of claim 1, wherein the third XOR operation using the first interim parity data and the second interim parity data produces the final parity data.

7. An Information Handling System (IHS), comprising:
   a first Redundant Array of Independent Disk (RAID) storage devices including:
      a first processing system; and
      a first memory system that is coupled to the first processing system and that includes instructions that, when executed by the first processing system, cause the first processing system to provide a first RAID storage engine that is configured to:
         receive at least one first command that identifies a second RAID storage device buffer subsystem as a first target memory location;
         retrieve, in response to the at least one first command, first RAID storage device data stored in the first RAID storage device and perform Direct Memory Access (DMA) operations to provide the first RAID storage device data to the second RAID storage device buffer subsystem;
   a second RAID storage device including:
      a second processing system; and
      a second memory system that is coupled to the second processing system and that includes instructions that, when executed by the second processing system, cause the second processing system to provide a second RAID storage engine that is configured to:
         receive at least one second command that identifies a third RAID storage device buffer subsystem as a second target memory location;
         perform, in response to the at least one second command, a first XOR operation using 1) the first RAID storage device data provided to the second RAID storage device buffer subsystem included in the second RAID storage device by the first RAID storage device and 2) second RAID storage device data stored in the second RAID storage device, in order to produce first interim parity data; and
         provide the first interim parity data to the third RAID storage device buffer subsystem; and a third RAID storage device including:
  a third processing system; and
  a third memory system that is coupled to the third processing system and that includes instructions that, when executed by the third processing system, cause the third processing system to provide a third RAID storage engine that is configured to:
   receive at least one third command;
   perform, in response to the at least one third command, a second XOR operation using 1) third RAID storage device data provided by a fourth RAID storage device in the third RAID storage device buffer subsystem included in the third RAID storage device and 2) fourth RAID storage device data stored in the third RAID storage device, in order to produce second interim parity data;
   receive at least one fourth command; and
   perform, in response to the at least one fourth command, a third XOR operation using 1) the first interim parity data provided to the third RAID storage device buffer subsystem by the second RAID storage device and 2) the second interim parity data in order to produce one of:
    1) third interim parity data, or
    2) final parity data.

8. The IHS of claim 7, the at least one fourth command identifies a fourth RAID storage device buffer subsystem as a fourth target memory location, and wherein the third RAID storage engine is configured to:
  provide the one of the 1) third interim parity data, or 2) the final parity data, to the fourth RAID storage device buffer subsystem.

9. The IHS of claim 7, wherein the first RAID storage device data and the second RAID storage device data includes:
  primary data.

10. The IHS of claim 7, wherein the first RAID storage engine is configured to:
  send, in response to providing the first RAID storage device data on the second RAID storage device buffer subsystem, a completion message.

11. The IHS of claim 10, wherein each of the at least one first command, the at least one second command, the at least one third command, and the at least one fourth command is received from a RAID storage controller device.

12. The IHS of claim 7, wherein the second RAID storage engine is configured to:
  send, in response to providing the first interim parity data to the third RAID storage device buffer subsystem, a completion message.

13. The IHS of claim 7, wherein each of the second RAID storage device buffer subsystem and the third RAID storage device buffer subsystem includes a respective Controller Memory Buffer (CMB).

14. A method for providing RAID storage-device-assisted data update operations, comprising:
  receiving, by a first RAID storage devices from a RAID storage controller device, at least one first command that identifies a second RAID storage device buffer subsystem as a first target memory location;
  retrieving, by the first RAID storage device in response to the at least one first command, first RAID storage device data stored in the first RAID storage device and performing Direct Memory Access (DMA) operations to provide the first RAID storage device data to the second RAID storage device buffer subsystem;
  receiving, by a second RAID storage device that includes the second RAID storage device buffer subsystem from the RAID storage controller device, at least one second command that identifies a third RAID storage device buffer subsystem as a second target memory location;
  performing, by the second RAID storage device in response to the at least one second command, a first XOR operation using 1) the first RAID storage device data provided to the second RAID storage device buffer subsystem by the first RAID storage device and 2) second RAID storage device data stored in the second RAID storage device, in order to produce first interim parity data;
  providing, by the second RAID storage device, the first interim parity data to the third RAID storage device buffer subsystem;
  receiving, by a third RAID storage device that includes the third RAID storage device buffer subsystem from the RAID storage controller device, at least one third command;
  performing, by the third RAID storage device in response to the at least one third command, a second XOR operation using 1) third RAID storage device data provided to the third RAID storage device buffer subsystem by a fourth RAID storage device and 2) fourth RAID storage device data stored in the third RAID storage device, in order to produce second interim parity data;
  receiving, by the third RAID storage device from the RAID storage controller device, at least one fourth command; and
  performing, by the third RAID storage device in response to the at least one fourth command, a third XOR operation using 1) the first interim parity data provided to the third RAID storage device buffer subsystem by the second RAID storage device and 2) the second interim parity data in order to produce one of:
   1) third interim parity data, or
   2) final parity data.

15. The method of claim 14, wherein the at least one fourth command identifies a fourth RAID storage device buffer subsystem as a fourth target memory location, and wherein the method further comprises:
  providing, by the third RAID storage device, the one of the 1) third interim parity data, or 2) the final parity data, to the fourth RAID storage device buffer subsystem.

16. The method of claim 14, wherein the first RAID storage device data and the second RAID storage device data includes:
  primary data.

17. The method of claim 14, further comprising:
  sending, by the first RAID storage devices in response to providing the RAID storage device data on the second RAID storage device buffer subsystem, a completion message to the RAID storage controller device.

18. The method of claim 17, further comprising:
  providing, by the RAID storage controller device in response to receiving the completion message from the first RAID storage devices, the at least one second command to the second RAID storage device.

19. The method of claim 14, further comprising:
  sending, by the second RAID storage device in response to providing the first interim parity data to the third RAID storage device buffer subsystem, a completion message to the RAID storage controller device.

20. The method of claim 14, wherein each of the second RAID storage device buffer subsystem and the third RAID storage device buffer subsystem includes a Controller Memory Buffer (CMB).

* * * * *

UNITED STATES PATENT AND TRADEMARK OFFICE
CERTIFICATE OF CORRECTION

PATENT NO. : 11,422,740 B2
APPLICATION NO. : 16/586445
DATED : August 23, 2022
INVENTOR(S) : Kotzur et al.

Page 1 of 1

It is certified that error appears in the above-identified patent and that said Letters Patent is hereby corrected as shown below:

In the Claims

Claim 7, Column 18, Line 32, "devices" should be changed to --device--;
Claim 8, Column 19, Line 27, "The IHS of claim 7, the at least one fourth command" should be changed to --The IHS of claim 7, wherein the at least one fourth command--;
Claim 9, Column 19, Line 36, "includes" should be changed to --include--;
Claim 14, Column 19, Line 58, "devices" should be changed to --device--;
Claim 16, Column 20, Line 51, "includes" should be changed to --include--;
Claim 17, Column 20, Line 54, "devices" should be changed to --device--;
Claim 17, Column 20, Line 55, "providing the RAID storage device" should be changed to --providing the first RAID storage device--;
Claim 18, Column 20, Line 61, "devices" should be changed to --device--.

Signed and Sealed this
Eleventh Day of October, 2022

Katherine Kelly Vidal
*Director of the United States Patent and Trademark Office*